(12) United States Patent
Watanabe

(10) Patent No.: US 6,987,697 B2
(45) Date of Patent: Jan. 17, 2006

(54) MEMORY DEVICE

(75) Inventor: Kazuhide Watanabe, Yao (JP)

(73) Assignee: Matsushita Electric Industrial Co., Ltd., (JP)

( * ) Notice: Subject to any disclaimer, the term of this patent is extended or adjusted under 35 U.S.C. 154(b) by 0 days.

(21) Appl. No.: 10/885,083

(22) Filed: Jul. 7, 2004

(65) Prior Publication Data

US 2005/0007828 A1    Jan. 13, 2005

(30) Foreign Application Priority Data

Jul. 7, 2003 (JP) .............................. 2003-271213

(51) Int. Cl.
    *G11C 16/04* (2006.01)
(52) U.S. Cl. .............................. 365/189.05; 365/189.08
(58) Field of Classification Search ........... 365/189.05, 365/189.08, 233, 230.08
    See application file for complete search history.

(56) References Cited

U.S. PATENT DOCUMENTS 5,073,872 A * 12/1991 Masuda et al. ......... 365/189.05
6,026,083 A *  2/2000 Albrow et al. ............... 370/347
6,493,272 B1 * 12/2002 Fujii et al. ............. 365/189.05

FOREIGN PATENT DOCUMENTS

JP      8-503093       4/1996
WO      WO 94/10687    5/1994

* cited by examiner

*Primary Examiner*—Anh Phung
(74) *Attorney, Agent, or Firm*—Steptoe & Johnson LLP

(57) ABSTRACT

According to the present invention, a state holding unit holds values indicating which process has written which data into a memory and a mask mechanism applies an operation to data stored in memory according to whether data in memory which a process is attempting to read is the data written by that process, thereby improving the security among processes.

7 Claims, 45 Drawing Sheets

FIG. 3

DATA HOLDING UNIT

| ADDRESS | HELD DATA |
|---------|-----------|
| 00 | ANY DATA |
| 01 | ANY DATA |
| 02 | ANY DATA |
| 03 | ANY DATA |
| 04 | ANY DATA |
| 05 | ANY DATA |
| 06 | ANY DATA |
| 07 | ANY DATA |

STATE HOLDING UNIT

| ADDRESS | STATE DATA |
|---------|------------|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 4

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 200 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 5

DATA HOLDING UNIT

| ADDRESS | HELD DATA |
|---------|-----------|
| 00 | ANY DATA |
| 01 | ANY DATA |
| 02 | ANY DATA |
| 03 | ANY DATA |
| 04 | DATA WRITTEN BY WRITE 200 |
| 05 | ANY DATA |
| 06 | ANY DATA |
| 07 | ANY DATA |

STATE HOLDING UNIT

| ADDRESS | STATE DATA |
|---------|------------|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 6

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 221 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 9

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | ANY DATA |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 10

DATA HOLDING UNIT

| ADDRESS | HELD DATA |
|---------|-----------|
| 00 | ANY DATA |
| 01 | ANY DATA |
| 02 | ANY DATA |
| 03 | ANY DATA |
| 04 | DATA WRITTEN BY WRITE 400 |
| 05 | ANY DATA |
| 06 | ANY DATA |
| 07 | ANY DATA |

STATE HOLDING UNIT

| ADDRESS | STATE DATA |
|---------|------------|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 11

DATA HOLDING UNIT

| ADDRESS | HELD DATA |
|---------|-----------|
| 00 | ANY DATA |
| 01 | ANY DATA |
| 02 | ANY DATA |
| 03 | ANY DATA |
| 04 | DATA WRITTEN BY WRITE 400 |
| 05 | ANY DATA |
| 06 | ANY DATA |
| 07 | ANY DATA |

STATE HOLDING UNIT

| ADDRESS | STATE DATA |
|---------|-----------|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 12

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 421 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 13

DATA HOLDING UNIT

| ADDRESS | HELD DATA |
|---------|-----------|
| 00 | ANY DATA |
| 01 | ANY DATA |
| 02 | ANY DATA |
| 03 | ANY DATA |
| 04 | DATA WRITTEN BY WRITE 421 |
| 05 | ANY DATA |
| 06 | ANY DATA |
| 07 | ANY DATA |

STATE HOLDING UNIT

| ADDRESS | STATE DATA |
|---------|------------|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 16

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | ANY DATA |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 17

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 600 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 18

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 600 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 19

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 621 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 20

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 621 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 21

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 641 |
| 05 | ANY DATA |
| 06 | ANY DATA |
| 07 | ANY DATA |

FIG. 24

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | ANY DATA |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 25

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 800 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 26

STATE HOLDING UNIT

| ADDRESS | STATE DATA |
|---|---|
| 00 | PERMIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

DATA HOLDING UNIT

| ADDRESS | HELD DATA |
|---|---|
| 00 | DATA WRITTEN BY WRITE 802 |
| 01 | ANY DATA |
| 02 | ANY DATA |
| 03 | ANY DATA |
| 04 | DATA WRITTEN BY WRITE 800 |
| 05 | ANY DATA |
| 06 | ANY DATA |
| 07 | ANY DATA |

FIG. 27

DATA HOLDING UNIT

| ADDRESS | HELD DATA |
|---|---|
| 00 | DATA WRITTEN BY WRITE 802 |
| 01 | ANY DATA |
| 02 | ANY DATA |
| 03 | ANY DATA |
| 04 | DATA WRITTEN BY WRITE 800 |
| 05 | ANY DATA |
| 06 | ANY DATA |
| 07 | ANY DATA |

STATE HOLDING UNIT

| ADDRESS | STATE DATA |
|---|---|
| 00 | PERMIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 28

DATA HOLDING UNIT

| ADDRESS | HELD DATA |
|---|---|
| 00 | DATA WRITTEN BY WRITE 802 |
| 01 | ANY DATA |
| 02 | ANY DATA |
| 03 | ANY DATA |
| 04 | DATA WRITTEN BY WRITE 821 |
| 05 | ANY DATA |
| 06 | ANY DATA |
| 07 | ANY DATA |

STATE HOLDING UNIT

| ADDRESS | STATE DATA |
|---|---|
| 00 | PERMIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 31

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | ANY DATA |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 32

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 1000 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 33

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 1000 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 36

DATA HOLDING UNIT

| ADDRESS | HELD DATA |
|---------|-----------|
| 00 | ANY DATA |
| 01 | ANY DATA |
| 02 | ANY DATA |
| 03 | ANY DATA |
| 04 | ANY DATA |
| 05 | ANY DATA |
| 06 | ANY DATA |
| 07 | ANY DATA |

STATE HOLDING UNIT

| ADDRESS | STATE DATA |
|---------|------------|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 37

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 1200 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 38

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 1200 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 39

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 1221 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 42

DATA HOLDING UNIT

| ADDRESS | HELD DATA |
|---------|-----------|
| 00 | ANY DATA |
| 01 | ANY DATA |
| 02 | ANY DATA |
| 03 | ANY DATA |
| 04 | ANY DATA |
| 05 | ANY DATA |
| 06 | ANY DATA |
| 07 | ANY DATA |

STATE HOLDING UNIT

| ADDRESS | STATE DATA |
|---------|------------|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 43

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 1400 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

FIG. 44

DATA HOLDING UNIT

| ADDRESS | HELD DATA |
|---|---|
| 00 | ANY DATA |
| 01 | ANY DATA |
| 02 | ANY DATA |
| 03 | ANY DATA |
| 04 | DATA WRITTEN BY WRITE 1400 |
| 05 | ANY DATA |
| 06 | ANY DATA |
| 07 | ANY DATA |

STATE HOLDING UNIT

| ADDRESS | STATE DATA |
|---|---|
| 00 | INHIBIT |
| 01 | INHIBIT |
| 02 | INHIBIT |
| 03 | INHIBIT |
| 04 | INHIBIT |
| 05 | INHIBIT |
| 06 | INHIBIT |
| 07 | INHIBIT |

FIG. 45

| DATA HOLDING UNIT | |
|---|---|
| ADDRESS | HELD DATA |
| 00 | ANY DATA |
| 01 | ANY DATA |
| 02 | ANY DATA |
| 03 | ANY DATA |
| 04 | DATA WRITTEN BY WRITE 1421 |
| 05 | ANY DATA |
| 06 | ANY DATA |
| 07 | ANY DATA |

| HOLDING UNITSTATE | |
|---|---|
| ADDRESS | STATE DATA |
| 00 | INHIBIT |
| 01 | INHIBIT |
| 02 | INHIBIT |
| 03 | INHIBIT |
| 04 | PERMIT |
| 05 | INHIBIT |
| 06 | INHIBIT |
| 07 | INHIBIT |

MEMORY DEVICE

BACKGROUND OF THE INVENTION

1. Field of the Invention

The present invention relates to a memory device that ensures security among a plurality of processes in an information processing system.

2. Description of the Related Art

Reads from conventional rewritable read-only memory devices are restricted as in the prior-art memory device described in National Publication of International Patent Application No. 08-503093.

However, prior-art read restriction is applicable only to read-only memory devices. The security of data stored in a readable and writable memory device shared among a number of processes cannot be ensured simply by permitting a process that has written data into a memory area to read the data from that area.

SUMMARY OF THE INVENTION

An object of the present invention is to provide a memory device that prevents information stored by a process performed before a reset from being read by a process performed after the reset, thereby improving the security of the process performed before the reset.

According to claim 1 of the present invention, there is provided a memory device including: a data holding unit that uses a value provided through an access address bus as an address to output a value held in a memory area associated with the address onto a hold data bus, and stores a value provided through a write data bus in a memory area associated with an address indicated through the access address bus when a write control signal is enabled; a state holding unit that changes values held in memory areas so as to indicate an inhibit state when a change-all-states signal is enabled, whether or not the write control signal is enabled, and changes a value held in a memory area corresponding to an address provided through the access address bus so as to indicate a permit state when the write control signal is enabled; and a mask mechanism that performs an operation between an output from the hold data bus and an output from the state holding unit to control the security of an output read onto the hold data bus.

The present invention is also characterized in that a logic element is provided between the state holding unit and the mask mechanism, the logic element being controlled by a permission forcing signal provided from a source external to the memory device so that all values held in the state holding unit that indicate write permit/inhibit states for write addresses can be changed at a time.

The present invention is also characterized in that a logic element is provided at an input of the state holding unit through which the change-all-states signal is inputted into the state holding unit, the logic element performing an operation between a plurality of change-all-states signals provided from a source external to the memory device to allow values held in the state holding unit to be changed.

The present invention is also characterized in that the state holding unit includes: a first state holding section that, whether or not the write control signal is enabled, changes values held in memory areas in the first state holding section so as to indicate the inhibit state when a first change-all-states signal is enabled, and changes a value held in a memory area in the first state holding section that corresponds to an address provided through the access address bus so as to indicate the permit state when the write control signal is enabled; a second state holding section that, whether or not the write control signal is enabled, changes values held in memory areas in the second state holding section so as to indicate the inhibit state when a second change-all-states signal is enabled, and changes a value held in a memory area in the second state holding section that corresponds to an address provided through the access address bus so as to indicate the permit state when the write control signal is enabled; and a logic element performing an operation of outputs of the first and second state holding sections, wherein the mask mechanism performs an operation between an output from the hold data bus and an output from the logic element to control the security of an output read onto the hold data bus.

The present invention is also characterized in that the mask mechanism includes: a first set of logic elements that performs an operation between an output from the hold data bus and an output from the state holding unit; a second set of logic elements that performs an operation between an output from the hold data bus and an output from the state holding unit, the operation performed by said second set of logic elements being different from the operation performed by the first set of logic elements; and a selector that selects and outputs as readout data the output from the first set of logic elements or the output from the second set of logic elements depending on a logic element selection signal specifying the permit state or inhibit state.

The present invention is also characterized in that the memory device includes an access address match detecting mechanism that detects a specific address for accessing the data holding unit, wherein all values in the state holding unit that indicate write permit/inhibit states for write addresses can be changed at a time by using a signal from the access address match detecting mechanism.

The present invention is also characterized in that the memory device includes a specific sequence detecting mechanism that detects a specific pattern of accesses to the data holding unit, wherein all values in the state holding unit that indicate write permit/inhibit states for write addresses can be changed at a time by using a signal from the specific sequence detecting mechanism.

The memory device according to the present invention includes a data holding unit that uses a value provided through an access address bus as an address to output a value held in a memory area associated with the address onto a hold data bus, and stores a value provided through a write data bus in a memory area associated with an address indicated through the access address bus when a write control signal is enabled; a state holding unit that changes values held in memory areas so as to indicate an inhibit state when a change-all-states signal is enabled, whether or not the write control signal is enabled, and changes a value held in a memory area corresponding to an address provided through the access address bus so as to indicate a permit state when the write control signal is enabled; and a mask mechanism that performs an operation between an output from the hold data bus and an output from the state holding unit to control the security of an output read onto the hold data bus. Therefore, information stored by a process performed before are set cannot be read by a process performed after the reset and accordingly the security of the process performed before the reset can be improved.

BRIEF DESCRIPTION OF THE DRAWINGS

FIG. 3 is a diagram showing states of a data holding unit 10 and state holding unit 11 performing the process shown in FIG. 2 according to the first embodiment;

FIG. 4 is a diagram showing states of the data holding unit 10 and state holding unit 11 performing the process shown in FIG. 2 according to the first embodiment;

FIG. 5 is a diagram showing states of the data holding unit 10 and the state holding unit 11 performing the process shown in FIG. 2 according to the first embodiment;

FIG. 6 is a diagram showing states of the data holding unit 10 and the state holding unit 11 performing the process shown in FIG. 2 according to the first embodiment;

FIG. 9 is a diagram showing states of a data holding unit 30 and a state holding unit 31 performing the process shown in FIG. 8 according to the second embodiment;

FIG. 10 is a diagram showing states of the data holding unit 30 and the state holding unit 31 performing the process shown in FIG. 8 according to the second embodiment;

FIG. 11 is a diagram showing states of the data holding unit 30 and the state holding unit 31 performing the process shown in FIG. 8 according to the second embodiment;

FIG. 12 is a diagram showing states of the data holding unit 30 and the state holding unit 31 performing the process shown in FIG. 8 according to the second embodiment;

FIG. 13 is a diagram showing states of the data holding unit 30 and the state holding unit 31 performing the process shown in FIG. 8 according to the second embodiment;

FIG. 16 is a diagram showing states of a data holding unit 50 and a state holding unit 51 performing the process shown in FIG. 15 according to the third embodiment;

FIG. 17 is a diagram showing states of the data holding unit 50 and the state holding unit 51 performing the process shown in FIG. 15 according to the third embodiment;

FIG. 18 is a diagram showing states of the data holding unit 50 and the state holding unit 51 performing the process shown in FIG. 15 according to the third embodiment;

FIG. 19 is a diagram showing states of the data holding unit 50 and the state holding unit 51 performing the process shown in FIG. 15 according to the third embodiment;

FIG. 20 is a diagram showing states of the data holding unit 50 and the state holding unit 51 performing the process shown in FIG. 15 according to the third embodiment;

FIG. 21 is a diagram showing states of the data holding unit 50 and the state holding unit 51 performing the process shown in FIG. 15 according to the third embodiment;

FIG. 24 is a diagram showing states of a data holding unit 70 and a state holding unit 71 performing the process shown in FIG. 23 according to the fourth embodiment;

FIG. 25 is a diagram showing states of the data holding unit 70 and the state holding unit 71 performing the process shown in FIG. 23 according to the fourth embodiment;

FIG. 26 is a diagram showing states of the data holding unit 70 and the state holding unit 71 performing the process shown in FIG. 23 according to the fourth embodiment of the present invention;

FIG. 27 is a diagram showing states of the data holding unit 70 and the state holding unit 71 performing the process shown in FIG. 23 according to the fourth embodiment;

FIG. 28 is a diagram showing states of the data holding unit 70 and the state holding unit 71 performing the process shown in FIG. 23 according to the fourth embodiment;

FIG. 31 is a diagram showing states of a data holding unit 90 and a state holding unit 91 performing the process shown in FIG. 30 according to the fifth embodiment;

FIG. 32 is a diagram showing states of the data holding unit 90 and the state holding unit 91 performing the process shown in FIG. 30 according to the fifth embodiment;

FIG. 33 is a diagram showing states of the data holding unit 90 and the state holding unit 91 performing the process shown in FIG. 30 according to the fifth embodiment;

FIG. 36 is a diagram showing states of a data holding unit 1100 and a state holding unit 1101 performing the process shown in FIG. 35 according to the sixth embodiment;

FIG. 37 is a diagram showing states of the data holding unit 1100 and the state holding unit 1101 performing the process shown in FIG. 35 according to the sixth embodiment;

FIG. 38 is a diagram showing states of the data holding unit 1100 and the state holding unit 1101 performing the process shown in FIG. 35 according to the sixth embodiment of the present invention;

FIG. 39 is a diagram showing states of the data holding unit 1100 and the state holding unit 1101 performing the process shown in FIG. 35 according to the sixth embodiment;

FIG. 42 is a diagram showing states of a data holding unit 1300 and a state holding unit 1301 performing the process shown in FIG. 41 according to the seventh embodiment;

FIG. 43 is a diagram showing states of the data holding unit 1300 and the state holding unit 1301 performing the process shown in FIG. 41 according to the seventh embodiment;

FIG. 44 is a diagram showing states of the data holding unit 1300 and the state holding unit 1301 performing the process shown in FIG. 41 according to the seventh embodiment; and FIG. 45 is a diagram showing states of the data holding unit 1300 and the state holding unit 1301 performing the process shown in FIG. 41 according to the seventh embodiment.

DESCRIPTION OF THE EMBODIMENTS

The present invention will be described below with respect to embodiments thereof.

(First Embodiment)

FIGS. 1 to 6 show a first embodiment of the present invention.

Figure 1:
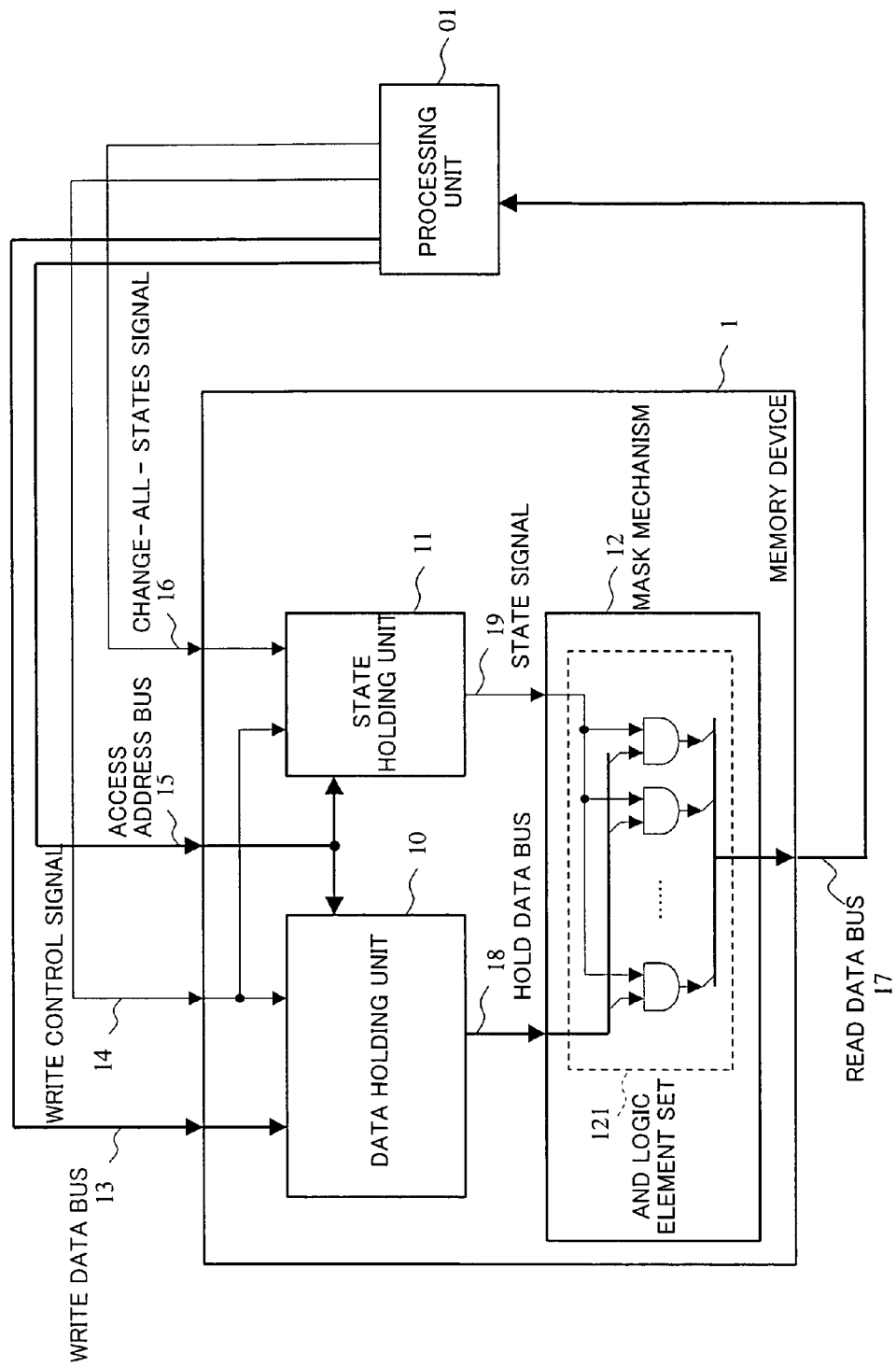
FIG. 1 is a block diagram showing a configuration of a memory device according to a first embodiment of the present invention.

FIG. 1 shows a memory device according to the first embodiment of the present invention.

Also shown in FIG. 1 is a processing unit 01 that controls the memory device 1.

The processing unit 01 performs a number of processes within it and, when information store or read is required, stores or reads the information in the memory device 1 through a write data bus 13, a write control signal 14, an access address bus 15, a change-all-states signal 16, and a read data bus 17. When reset, the processing unit 01 enables the change-all-states signal 16.

The memory device 1 includes a data holding unit 10, a state holding unit 11, and a mask mechanism 12. The mask mechanism 12 consists of a set of AND logic elements 121.

The memory device 1 has the write data bus 13, write control signal 14, access address bus 15, and change-all-states signal 16 as its inputs and has the read data bus 17 as its output.

The data holding unit 10 has the write data bus 13, write control signal 14, and access address bus 15 as its inputs and has the hold data bus 18 as its output.

The state holding unit 11 has the change-all-states signal 16, write control signal 14, and access address bus 15 as its inputs and has the state signal 19 as its output.

The mask mechanism 12 has the hold data bus 18, which is the output of the data holding unit 10, and the state signal 19, which is the output of the state holding unit 11, as its inputs and has the read data bus 17 as its output.

The AND logic element set 121 has the hold data bus 18, which is an input to the mask mechanism 12, and the state signal 19 as its inputs and outputs data onto the read data bus 17.

The data holding unit 10 is a readable and writable memory device, which uses a value provided through the access address bus 15 as an address and outputs a value stored in a multiple-bit-wide memory area associated with that address onto the hold data bus 18. The data holding unit 10 stores a value provided through the write data bus 13 in a multiple-bit-wide memory area associated with an address indicated through the access address bus 15 when the write control signal 14 is enabled.

The state holding unit 11 is a readable and writable memory device consisting of as many single-bit-wide memory areas as the number of the memory areas in the data holding unit 10. All the values held in the memory areas in the state holding unit 11 are changed to "0," whether or not the write control signal 14 is enabled, by enabling the change-all-states signal 16. When the write control signal 14 is enabled, a value provided through the access address bus 15 is used as an address to change the value held in the memory area associated with the address to "1."

Hereinafter the state in which the value held in a memory area in the state holding unit 11 is "0" is called the inhibit state and the state in which the value "1" is held in a memory area is called the permit state.

In the mask mechanism 12, the set of AND logic elements 121 carries out the AND operation between each bit from the hold data bus 18 and the state signal 19 and outputs the result onto the read data bus 17.

Operation in which the memory device shown in FIG. 1 is used to perform a process sequence shown in FIG. 2 will be described below.

Figure 2:
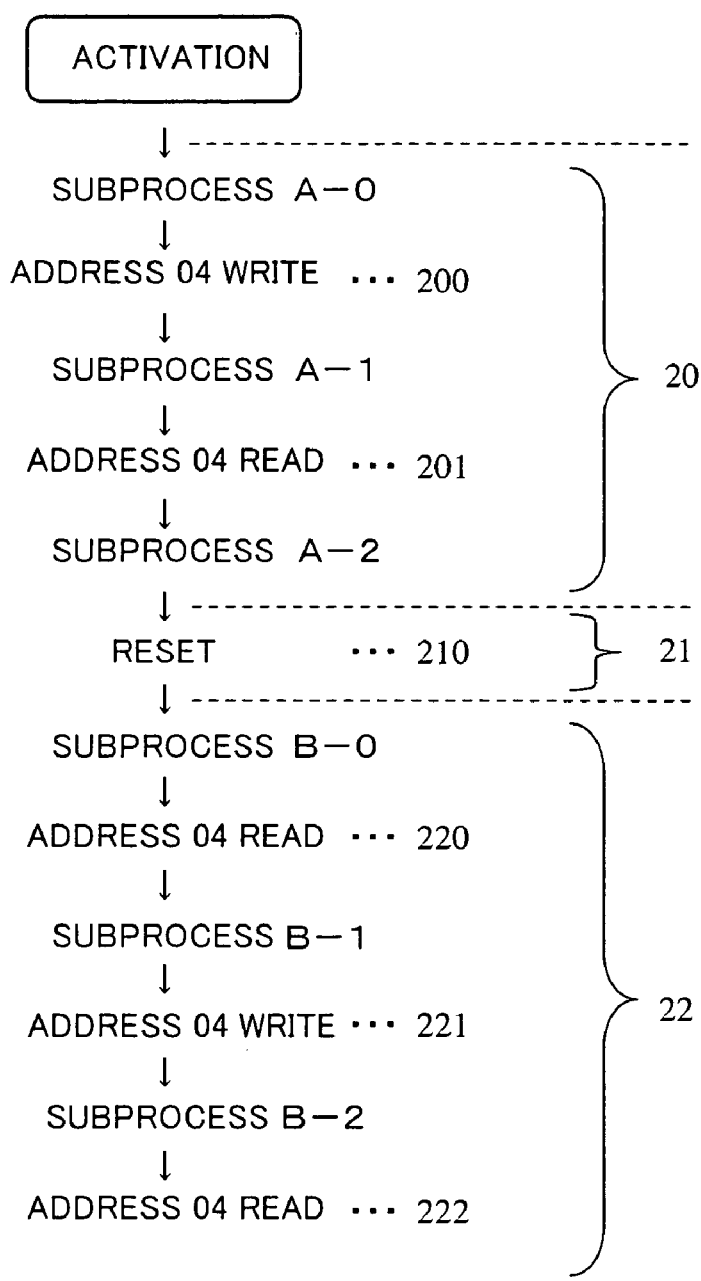
FIG. 2 is a flowchart of a process performed in a processing unit 01 according to the first embodiment.

FIG. 2 shows process A indicated by reference numeral 20, a reset sequence 21 for resetting the processing unit 01, and process B indicated by reference numeral 22, which are performed by the processing unit 01 in sequence.

In process A indicated by reference numeral 20, subprocess A-0, a write 200 to address 04, subprocess A-1, a read 201 from address 04, and subprocess A-2 are performed in sequence.

In process B indicated by reference numeral 22, subprocess B-0, a read 220 from address 04, subprocess B-1, a write 221 to address 04, subprocess B-2, and a read 222 from address 04 are performed in sequence.

Subprocesses A-0, A-1, A-2, B-0, B-1, and B-2 represent subprocesses that do not involve accesses to the memory device 1 by the processing unit 01.

FIG. 3 shows internal states of the data holding unit 10 and the state holding unit 11 immediately after the processing unit 01 is activated.

Any values may be held in the data holding unit 10 and all values held in the state holding unit 11 are indicating the inhibit state.

FIG. 4 shows internal states of the data holding unit 10 and the state holding unit 11 after the address 04 write 200, which is an operation in process A 20, is performed.

On completion of address 04 write 200, a value from the write data bus 13 is stored in the memory area in the data holding unit 10 that is associated with address 04 while the value stored in the memory area in the state holding unit 11 corresponding to address 04 holds the permit state "1."

Execution of an address 04 read 201, which is an operation in process A 20, will be described below.

When an address 04 read 201 is performed, the memory area in the data holding unit 10 associated with address 04 contains a value written by the address 04 write 200. Accordingly, the value written by the address 04 write 200 is read out onto the hold data bus 18.

The memory area in the state holding unit 11 that corresponds to address 04 contains the permit state "1" and therefore the value "1" is outputted onto the state signal 19.

Thus, the same value as the value on the hold data bus 18 is outputted onto the read data bus 17 as a result of AND operations performed by the set of AND logic elements 121. In this way, the value written by the write 200 to address 04 can be read out.

FIG. 5 shows internal states of the data holding unit 10 and the state holding unit 11 after the completion of the reset sequence 21.

In the reset sequence 21, the change-all-states signal 16 is enabled by the processing unit 01 and as a result all values held in the state holding unit 11 are changed to the inhibit state "0" whereas the values in the data holding unit 10 are not changed in the memory device 1.

An address 04 read 220, which is an operation in process B 22, will be described below.

When an address 04 read 220 is performed, the memory area in the data holding unit 10 associated with address 04 contains a value written by the write 200 to address 04.

Accordingly, the value written by the address 04 write 200 is read out onto the hold data bus 18.

However, the memory area in the state holding unit 11 that corresponds to address 04 contains the inhibit state "0" because of the execution of the reset sequence 21, therefore "0" is outputted onto the state signal 19.

Thus, a different value than the value on the hold data bus 18 is outputted onto the read data bus 17 as a result of AND operations performed by the set of AND logic elements 121. Therefore, the value written by the write 200 to address 04 cannot be read.

FIG. 6 shows internal states of the data holding unit 10 and the state holding unit 11 after the completion of the write 221 to address 04, which is an operation in process B 22.

When a value from the write data bus 13 is stored in the memory area in the data holding unit 10 associated with address 04 by a write 221 to address 04, the value stored in the memory area in the state holding unit 11 that corresponds to address 04 holds at the same time the permit state "1."

Consequently, the value that was stored in the memory area in the data holding unit 10 associated with address 04 by an address 04 write 200, which is an operation in process A 20, is destroyed and the value written by the address 04 write 221, which is an operation in process B 22, is held in that memory area.

A read 222 from address 04, which is an operation in process B 22, will be described below.

When an address 04 read 222 is performed, the memory area in the data holding unit 10 associated with address 04 contains a value written by a write 221 to address 04 and accordingly the value written by the address 04 write 221 is read out onto the hold data bus 18.

The memory area in the state holding unit 11 that corresponds to address 04 contains the permit state "1" and therefore "1" is outputted onto the state signal 19.

Thus, the same value as the value on the hold data bus 18 is outputted onto the read data bus 17 as a result of AND operations performed by the set of AND logic elements 121. In this way, the value written by the address 04 write 221 can be read.

As described above, the memory device according to the present embodiment prevents information stored by a process performed before a reset from being read by a process after the reset and thus the security of the process before the reset can be improved.

(Second Embodiment)

FIGS. 7 to 13 show a second embodiment of the present invention.

Figure 7:
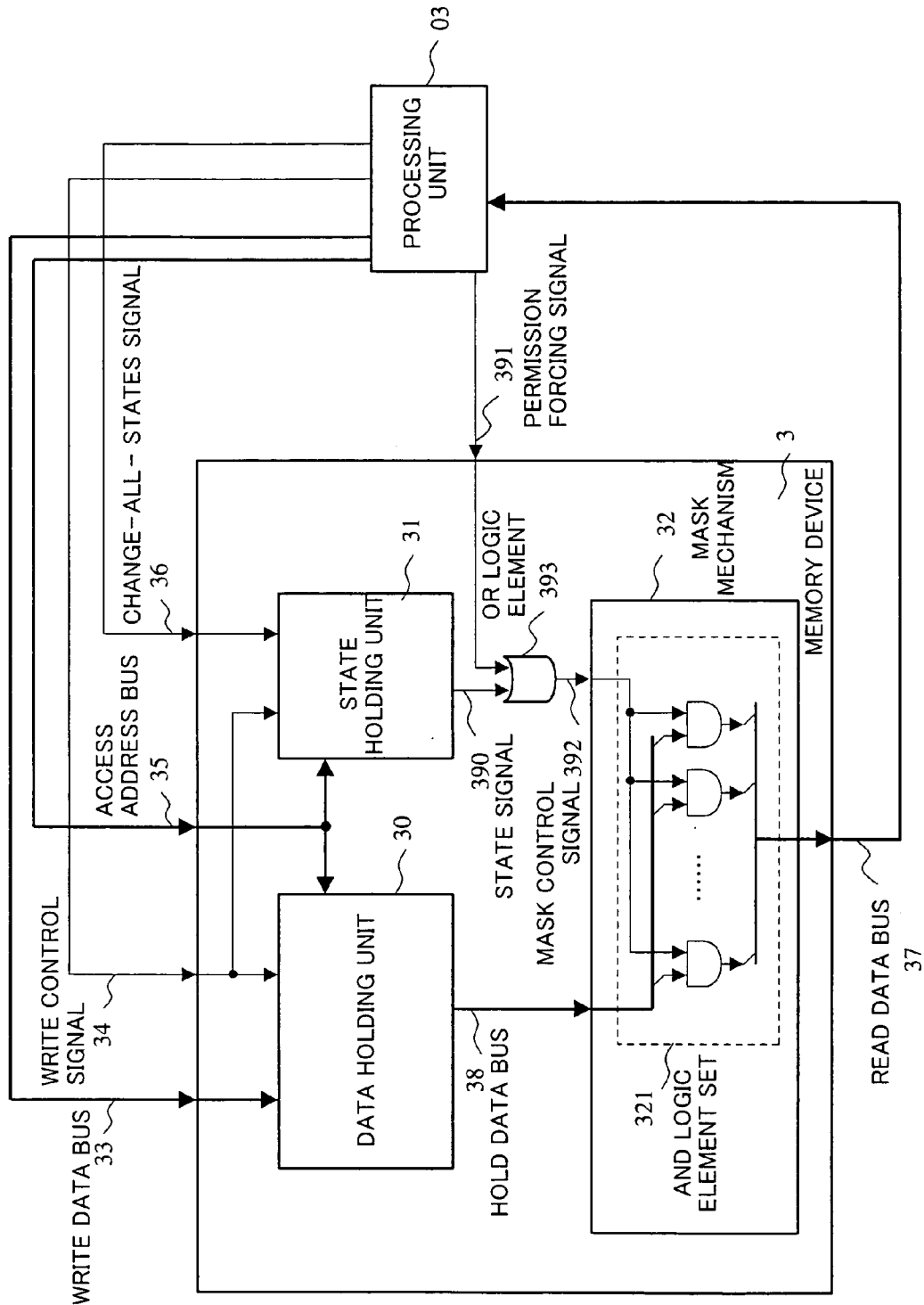
FIG. 7 is a block diagram showing a configuration of a memory device according to a second embodiment of the present invention.

FIG. 7 shows a memory device according to the second embodiment.

Also shown in FIG. 7 is a processing unit 03 that controls the memory device. The second embodiment differs from the first embodiment in that an OR logic element 393 in FIG. 7, for example, is provided in order to allow a mask mechanism 32 to be controlled by a permission forcing signal 391 from a source external to the memory device independently of a value in a state holding unit 31 that indicates the write permit/inhibit state of a write address.

The processing unit 03 performs a number of processes within it and, when information store or read is required, stores or reads information in the memory device 3 through a write data bus 33, a write control signal 34, an access address bus 35, a change-all-states signal 35, and a read data bus 37. When reset, the control unit 03 enables the change-all-states signal 36. It enables a permission forcing signal 391 when performing a process in supervisor mode.

The memory device 3 includes a data holding unit 30, a state holding unit 31, a mask mechanism 32, and an OR logic element 393. The mask mechanism 32 includes a set of AND logic elements 321.

The memory device 3 has the write data bus 33, write control signal 34, access address bus 35, a change-all-states signal 36, and permission forcing signal 391 as its inputs, and has the read data bus 37 as its output.

The data holding unit 30 has the write data bus 33, write control signal 34, and access address bus 35 as its inputs and has a hold data bus 38 as its output.

The state holding unit 31 has the change-all-states signal 36, write control signal 34, and access address bus 35 as its inputs and has a state signal 390 as its output.

The OR logic element 393 receives the state signal 390 and the permission forcing signal 391 as its inputs and outputs a mask control signal 392.

The mask mechanism 32 has a hold data bus 38, which is the output of the data holding unit 30, and a mask signal 392, which is the output of the OR logic element, as its inputs and has the read data bus 37 as its output.

The AND logic element set 321 has as its inputs the hold data bus 38 and the mask signal 392, which are the inputs of the mask mechanism 32, and outputs data onto the read data bus 37.

The data holding unit 30 is a readable and writable memory device which uses a value provided through the access address bus 35 as an address and outputs a value stored in a multiple-bit-wide memory area associated with that address onto the hold data bus 38. Also, a value provided through the write data bus 33 is stored in a multiple-bit-wide memory area in the data holding unit 30 that is associated with an address indicated through the access address bus 35 when the write control signal 34 is enabled.

The state holding unit 31 is a readable and writable memory device including as many single-bit-wide memory areas as the number of the memory areas in the data holding unit 30. All the values held in the memory areas in the state holding unit 31 are changed to "0," whether or not the write control signal 34 is enabled, by enabling the change-all-states signal 36. When the write control signal 34 is enabled, a value provided through the access address bus 35 is used as an address to change the value held in the memory area associated with the address to "1." Hereinafter the state in which the value held in a memory area in the state holding unit 31 is "0" is called the inhibit state and the state in which the value "1" is held in a memory area is called the permit state.

The OR logic element 393 uses the state signal 390 and the permission forcing signal 391 as its inputs to perform an OR operation and outputs a mask control signal 392.

In the mask mechanism 32, the set of AND logic elements 321 carries out the AND operation between each bit from the hold data bus 38 and the mask signal 392 and outputs the result onto the read data bus 37.

Operation in which the memory device shown in FIG. 7 is used to perform a process sequence shown in FIG. 8 will be described below.

Figure 8:
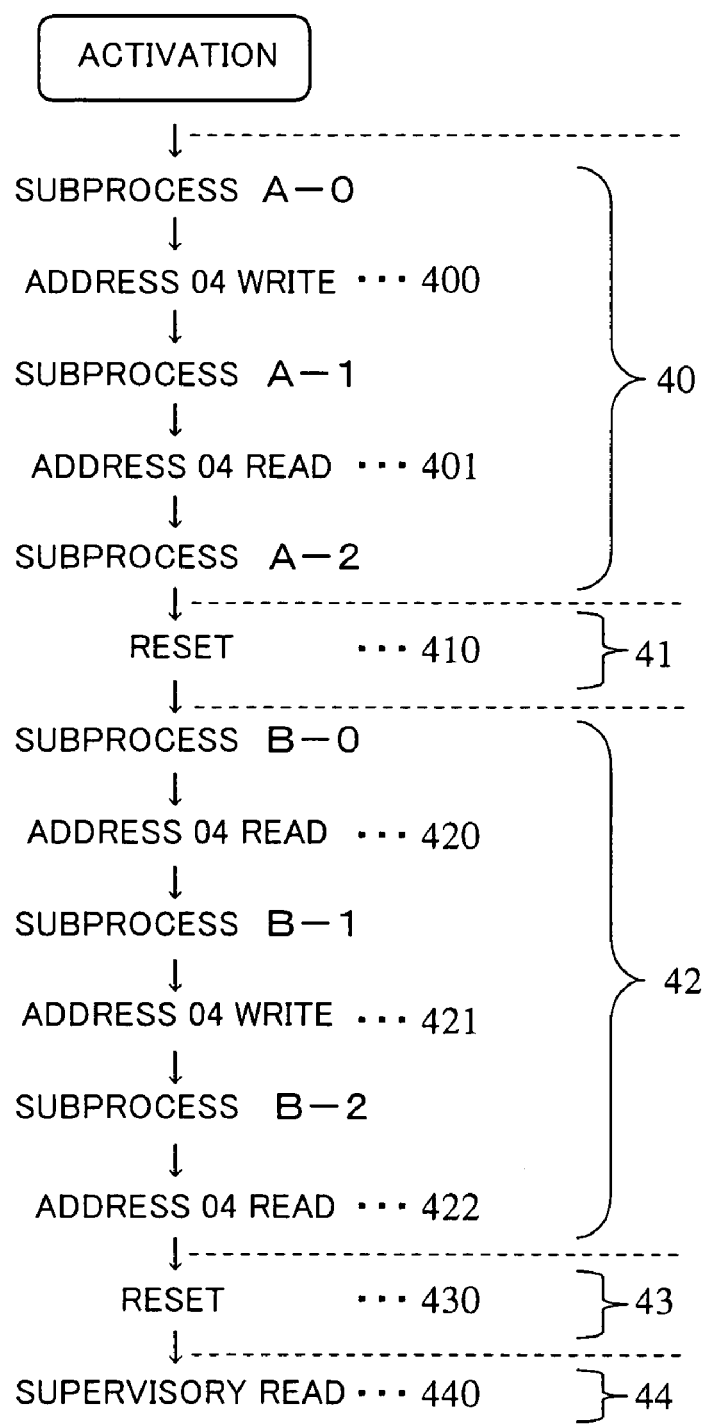
FIG. 8 is a flowchart of a process performed in a processing unit 03 according to the second embodiment.

FIG. 8 shows process A indicated by reference numeral 40, a reset sequence 41, process B 42, a reset sequence 43, and supervisory read 44, which are performed by the processing unit 03 in sequence.

In process A 40, subprocess A-0, a write 400 to address 04, subprocess A-1, a read 401 from address 04, and subprocess A-2 are performed in sequence.

In the reset sequences 41 and 43, the processing unit 03 is reset.

In process B indicated by reference numeral 42, subprocess B-0, a read 420 from address 04, subprocess B-1, a write 421 to address 04, subprocess B-2, and a read 422 from address 04 are performed in sequence.

In the supervisory read 44, the processing unit 03 reads address 04 in supervisory mode.

Subprocesses A-0, A-1, A-2, B-0, B-1, and B-2 represent operations that do not involve accesses to the memory device 3 by the processing unit 03.

FIG. 9 shows internal states of the data holding unit 30 and the state holding unit 31 immediately after the processing unit 03 is activated.

Any values may be held in the data holding unit 30 and the values held in the state holding unit 31 are indicating the inhibit state.

FIG. 10 shows internal states of the data holding unit 30 and the state holding unit 31 after the completion of a write 400 to address 04, which is an operation in process A 40.

When a value from the write data bus 33 is stored in the memory area in the data holding unit 30 associated with address 04 by a write 400 to address 04, the value stored in the memory area in the state holding unit 31 that corresponds to address 04 holds at the same time the permit state "1."

Execution of an address 04 read 401, which is an operation in process A 40, will be described below.

When an address 04 read 401 is performed, the memory area in the data holding unit 30 associated with address 04 contains a value written by the write 400 to address 04. Accordingly, the value written by the address 04 write 400 is read out onto the hold data bus 38.

Because the value "1" indicating the permit state is held in the memory area in the state holding unit 31 that corresponds to address 04 and the process is performed in user mode, the permission forcing signal 391 takes the value "0" indicating that the signal 391 is disabled. Consequently, "1" is outputted onto the mask control signal 392.

Thus, the same value as that on the hold data bus 38 is outputted onto the read data bus 37 as a result of AND operations performed by the set of AND logic elements 321. Therefore the value written by the write 400 to address 04 can be read.

FIG. 11 shows internal states of the data holding unit 30 and the state holding unit 31 after the completion of a reset sequence 41.

In the reset sequence, the change-all-states signal 36 is enabled by the processing unit 03 and as a result all values held in the state holding unit 31 are changed to the inhibit state "0" whereas the values in the data holding unit 30 are not changed in the memory device 3.

An address 04 read 420, which is an operation in process B 42, will be described below.

When an address 04 read 420 is performed, the memory area in the data holding unit 30 associated with address 04 contains a value written by the write 400 to address 04 and accordingly the value written by the address 04 write 400 is read out onto the hold data bus 38.

However, because the memory area in the state holding unit 31 that corresponds to address 04 contains the inhibit state "0" as a result of the reset sequence 41 and the process is performed in user mode, the permission forcing signal 391 takes "0" indicating that the permission forcing signal 391 is disabled. Consequently, "0" is outputted onto the mask control signal 392.

Thus, the AND logic element set 321 outputs a value different from the value on the hold data bus 38 onto the read data bus 37 as a result of AND operations, therefore the value written by address 04 write 400 cannot be read.

FIG. 12 shows internal states of the data holding unit 30 and the state holding unit 31 after the completion of a write 421 to address 04, which is an operation in process B 42.

When a value provided through the write data bus 33 is written in the memory area in the data holding unit 30 associated with address 04 by the address 04 write 421, the value held in the memory area in the state holding unit 31 that corresponds to address 04 holds the permission state "1."

Consequently, the value that was stored in the memory area in the data holding unit 30 associated with address 04 by an address 04 write 400, which is an operation in process A 40, is destroyed and the value written by the address 04 write 421, which is an operation in process B 42, is held in that memory area.

A read 422 from address 04, which is an operation in process B 42, will be described below.

When the address 04 read 422 is performed, the memory area in the data holding unit 30 associated with address 04 contains a value written by the write 421 to address 04. Accordingly, the value written by the address 04 write 421 is outputted onto the hold data bus 38.

The value in the memory area in the state holding unit 31 that corresponds to address 04 holds the permit state "1," therefore "1" is outputted onto the mask control signal 392.

Thus, the set of AND logic elements 321 outputs the same value as the value on the hold data bus 38 onto the read data bus 37 as a result of AND operations. Therefore, the value written by the address 04 write 421 can be read.

FIG. 13 shows internal states of the data holding unit 30 and the state holding unit 31 after the completion of a reset sequence 43.

In the reset sequence, the change-all-states signal 36 is enabled by the processing unit 03 and as a result all values held in the state holding unit 31 are changed to "0" indicating the inhibit state whereas the values in the data holding unit 30 are not changed in the memory device 3.

Operation for executing a supervisory read 44 will be described below.

Because the read 44 is performed in supervisory mode, the permission forcing signal 391 for the memory device 3 is set by the processing unit 03 to "1" indicating that the permission forcing is enabled.

This allows the mask control signal 392 to provide "1" indicating the permit state regardless of the value held in the state holding unit 31.

Thus, for all addresses, the data held in the data holding unit 30 is outputted onto the read data bus 37 through the mask mechanism 32.

As described above, the memory device according to the second embodiment can improve the security of a process performed after a reset because a process normally cannot read information stored before a rest. Furthermore, a supervisor process can read information stored before a reset even after the reset and therefore higher manageability can be provided. Thus, the security and manageability can be made compatible with each other.

(Third Embodiment)

FIGS. 14 to 21 show a third embodiment of the present invention.

Figure 14:
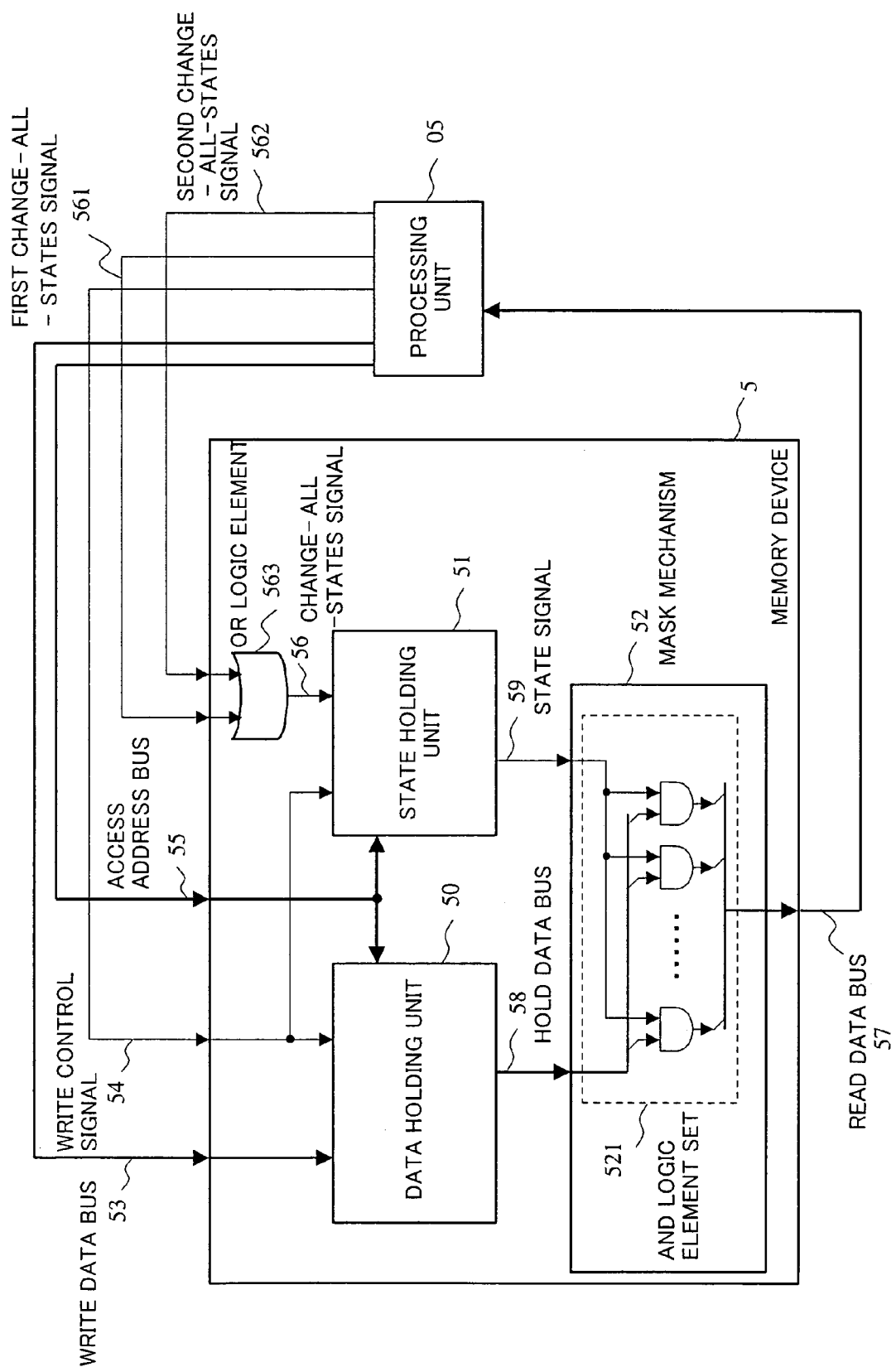
FIG. 14 is a block diagram showing a configuration of a memory device according to a third embodiment of the present invention.

FIG. 14 shows a memory device as well as processing unit 05 for controlling the memory device. The third embodiment differs from the first embodiment in that an OR logic element 563 as shown in FIG. 14, for example, is provided in order to allow a value held in a state holding unit 51 to be changed. More specifically, the OR logic element 563 is provided at the input of the state holding unit 51 at which a change-all-states signal 56 is inputted for carrying out an operation on more than one change-all-states signals 561 and 562 from the external of the memory device.

The processing unit 05 performs a number of processes within it and, when information store or read is required, stores or reads information in the memory device 5 through a write data bus 53, a write control signal 54, an access address bus 55, a first change-all-states signal 561, a second change-all-states signal 562, and a read data bus 57. When the control unit 05 is reset, "1" is outputted onto the first change-all-states signal 561 indicating that the first change-all-states signal 561 is enabled and "1" is outputted. When a process switching sequence is performed, "1" is outputted onto the second change-all-states signal 562 indicating that the second change-all-states signal 562 is enabled.

The memory device 5 includes a data holding unit 50, state holding unit 51, a mask mechanism 52, and an OR logic element 563. The mask mechanism 52 includes a set of AND logic elements 521.

The memory device 5 has the write data bus 53, write control signal 54, access address bus 55, first change-all-states signal 561, and second change-all-states signal 562 as its inputs and has the read data bus 57 as its output.

The data holding unit 50 has the write data bus 53, write control signal 54, and access address bus 55 as inputs and has a hold data bus 58 as its output.

The state holding unit 51 has the change-all-states signal 56, write control signal 54, and access address bus 55 as its inputs and has a state signal 59 as its output.

The mask mechanism 52 has the hold data bus 58, which is the output of the data holding unit 50, and the state signal 59, which is the output of the state holding unit 51, as its inputs and has the read data bus 57 as its output.

The AND logic element set 521 has as its inputs the hold data bus 58 and state signal 59, which are the inputs of the mask mechanism 52, and outputs data onto the read data bus 57.

The OR logic element 563 has the first and second change-all-states signals 561 and 562 as its inputs and has the change-all-states signal 56 as its output.

The data holding unit 50 is a readable and writable memory device which uses a value provided through the access address bus 55 as an address and outputs a value stored in a multiple-bit-wide memory area associated with that address onto the hold data bus 58. Also, a value provided through the write data bus 53 is stored in a multiple-bit-wide memory area in the data holding unit 50 that is associated with an address indicated through the access address bus 55 when the write control signal 54 is enabled.

The state holding unit 51 is a readable and writable memory device including as many single-bit-wide memory areas as the number of the memory areas in the data holding unit 50. All the values held in the memory areas in the state holding unit 51 are changed to "0," whether or not the write control signal 54 is enabled, by enabling the change-all-states signal 56. When the write control signal 54 is enabled, a value provided through the access address bus 55 is used as an address to change the value held in the memory area associated with the address to "1." Hereinafter the state in which the value held in a memory area in the state holding unit 51 is "0" is called the inhibit state and the state in which the value "1" is held in a memory area is called the permit state.

In the mask mechanism 52, the set of AND logic elements 521 carries out the AND operation between each bit from the hold data bus 58 and the state signal 59 and outputs the result onto the read data bus 57.

The OR logic element 563 carries out an OR operation between the first change-all-states signal 561 and the second change-all-states signal 562 which are inputs of the OR logic element 563 and outputs the result onto the change-all-states signal 56.

Operation in which the memory device shown in FIG. 14 is used to perform a process sequence shown in FIG. 15 will be described below.

Figure 15:
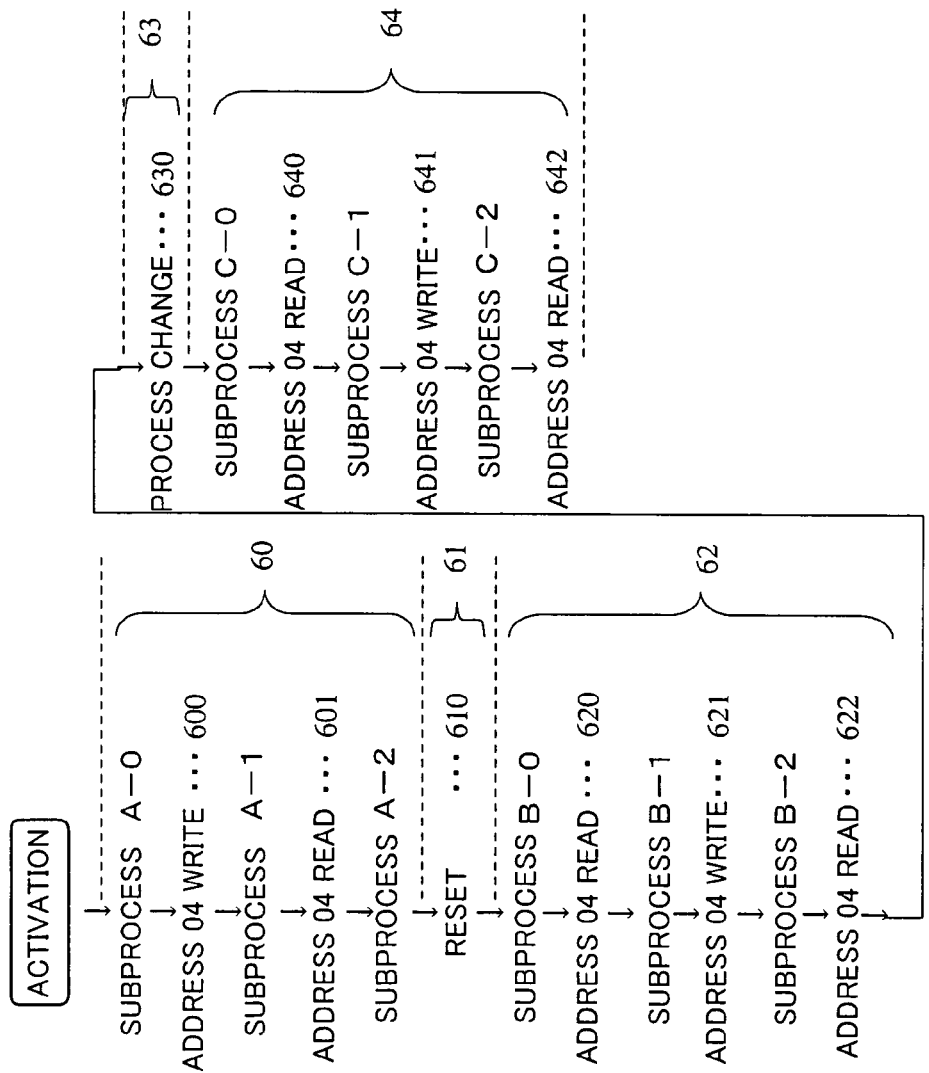
FIG. 15 is a flow chart of a process performed in a processing unit 05 according to the third embodiment.

FIG. 15 shows process A indicated by reference numeral 60, a reset sequence 61, process B 62, a process switching sequence 63, and process C indicated by reference numeral 64, which are performed by the processing unit 05 in sequence.

In process A 60, subprocess A-0, a write 600 to address 04, subprocess A-1, a read 601 from address 04, and subprocess A-2 are performed in sequence.

In the reset sequence 61, the processing unit 05 is reset.

In process B indicated by reference numeral 62, subprocess B-0, a read 620 from address 04, subprocess B-1, a write 621 to address 04, subprocess B-2, and a read 622 from address 04 are performed in sequence.

In the process switching sequence 63, the processing unit 05 enters a process switching sequence.

In process C indicated by reference numeral 64, subprocess C-0, a read 640 from address 04, subprocess C-1, a write 641 to address 04, subprocess C-2, and a read 642 from address 04 are performed in sequence.

Subprocesses A-0, A-1, A-2, B-0, B-1, B-2, C-0, C-1, and C-2 represent operations that do not involve access to the memory device 5 by the processing unit 05.

FIG. 16 shows internal states of the data holding unit 50 and the state holding unit 51 immediately after activation of the processing unit 05.

Any values may be held in the data holding unit 50 and all values held in the state holding unit 51 are indicating the inhibit state.

FIG. 17 shows internal states of the data holding unit 50 and the state holding unit 51 after the completion of a write 600 to address 04, which is an operation in process A 60.

When a value from the write data bus 53 is stored in the memory area in the data holding unit 50 associated with address 04 by a write 600 to address 04, the value stored in the memory area in the state holding unit 51 that corresponds to address 04 holds at the same time the permit state "1."

Execution of an address 04 read 601, which is an operation in process A 60, will be described below.

When an address 04 read 601 is performed, the memory area in the data holding unit 50 associated with address 04 contains a value written by the write 600 to address 04. Accordingly, the value written by the address 04 write 600 is read out onto the hold data bus 58.

Because the value "1" indicating the permit state is held in the memory area in the state holding unit 51 that corresponds to address 04, "1" is outputted onto the state signal 59.

Thus, the same value as that on the hold data bus 58 is outputted onto the read data bus 57 as a result of AND operations performed by the set of AND logic elements 521. Therefore the value written by the write 600 to address 04 can be read.

FIG. 18 shows internal states of the data holding unit 50 and the state holding unit 51 after the completion of a reset sequence 61.

In the reset sequence, the first change-all-states signal 561 is enabled by the processing unit 05 and as a result the change-all-states signal 56 is enabled and all values held in the state holding unit 51 are changed to the inhibit state "0" whereas the values in the data holding unit 50 are not changed in the memory device 5.

An address 04 read 620, which is an operation in process B 62, will be described below.

When an address 04 read 620 is performed, the memory area in the data holding unit 50 associated with address 04 contains a value written by the write 600 to address 04 and accordingly the value written by the address 04 write 600 is read out onto the hold data bus 58.

However, because the memory area in the state holding unit 51 that corresponds to address 04 contains the inhibit state "0" as a result of the reset sequence 61, "0" is outputted onto the state signal 59.

Thus, the AND logic element set 521 outputs a value different from the value on the hold data bus 58 onto the read data bus 57 as a result of AND operations, therefore the value written by address 04 write 600 cannot be read.

FIG. 19 shows internal states of the data holding unit 50 and the state holding unit 51 after the completion of a write 621 to address 04, which is an operation in process B 62.

When a value provided through the write data bus 53 is written in the memory area in the data holding unit 50 associated with address 04 by the address 04 write 621, the value held in the memory area in the state holding unit 51 that corresponds to address 04 holds the permit state "1."

Consequently, the value that was stored in the memory area in the data holding unit 50 associated with address 04 by an address 04 write 600, which is an operation in process A 60, is destroyed and the value written by the address 04 write 621, which is an operation in process B 62, is held in that memory area.

A read 622 from address 04, which is an operation in process B 62, will be described below.

When the address 04 read 622 is performed, the memory area in the data holding unit 50 associated with address 04 contains a value written by the write 621 to address 04. Accordingly, the value written by the address 04 write 621 is outputted onto the hold data bus 58.

The value in the memory area in the state holding unit 51 that corresponds to address 04 holds the permit state "1," therefore "1" is outputted onto the state signal 59.

Thus, the set of AND logic elements 521 outputs the same value as the value on the hold data bus 58 onto the read data bus 57 as a result of AND operations. Therefore, the value written by the address 04 write 621 can be read.

FIG. 20 shows internal states of the data holding unit 50 and the state holding unit 51 after the completion of a process switching sequence 63.

In the process switching sequence, the second change-all-states signal 562 is enabled by the processing unit 05 and as a result the change-all-states signal 56 is enabled and all values held in the state holding unit 51 are changed to the inhibit state "0" whereas the values in the data holding unit 50 are not changed in the memory device.

An address 04 read 640, which is an operation in process C 64, will be described below.

When an address 04 read 640 is performed, the memory area in the data holding unit 50 associated with address 04 contains a value written by the write 621 to address 04 and accordingly the value written by the address 04 write 621 is read out onto the hold data bus 58.

However, because the memory area in the state holding unit 51 that corresponds to address 04 contains the inhibit state "0" as a result of the process switching sequence 63, "0" is outputted onto the state signal 59.

Thus, the AND logic element set 521 outputs a value different from the value on the hold data bus 58 onto the read data bus 57 as a result of AND operations, therefore the value written by address 04 write 621 cannot be read.

FIG. 21 shows internal states of the data holding unit 50 and the state holding unit 51 after the completion of a write 621 to address 04, which is an operation in process C 64.

When a value provided through the write data bus 53 is written in the memory area in the data holding unit 50 associated with address 04 by the address 04 write 641, the value held in the memory area in the state holding unit 51 that corresponds to address 04 holds the permit state "1."

Consequently, the value that was stored in the memory area in the data holding unit 50 associated with address 04 by an address 04 write 621, which is an operation in process B 62, is destroyed and the value written by the address 04 write 641, which is an operation in process C 64, is held in that memory area.

A read 642 from address 04, which is an operation in process C 64, will be described below.

When the address 04 read 642 is performed, the memory area in the data holding unit 50 associated with address 04 contains a value written by the write 641 to address 04. Accordingly, the value written by the address 04 write 641 is outputted onto the hold data bus 58.

The value in the memory area in the state holding unit 51 that corresponds to address 04 holds the permit state "1," therefore "1" is outputted onto the state signal 59.

Thus, the set of AND logic elements 521 outputs the same value as the value on the hold data bus 58 onto the read data bus 57 as a result of AND operations. Therefore, the value written by the address 04 write 641 can be read.

As described above, the memory device according to the present embodiment prevents information stored by a previously performed process from being read by a process performed after a reset. Thus, the memory device can address a plurality of events the security of which should be ensured because of a number of factors such as reset and process switching. In this way, the security among processes can be improved.

(Fourth Embodiment)

FIGS. 22 to 28 show a fourth embodiment of the present invention.

Figure 22:
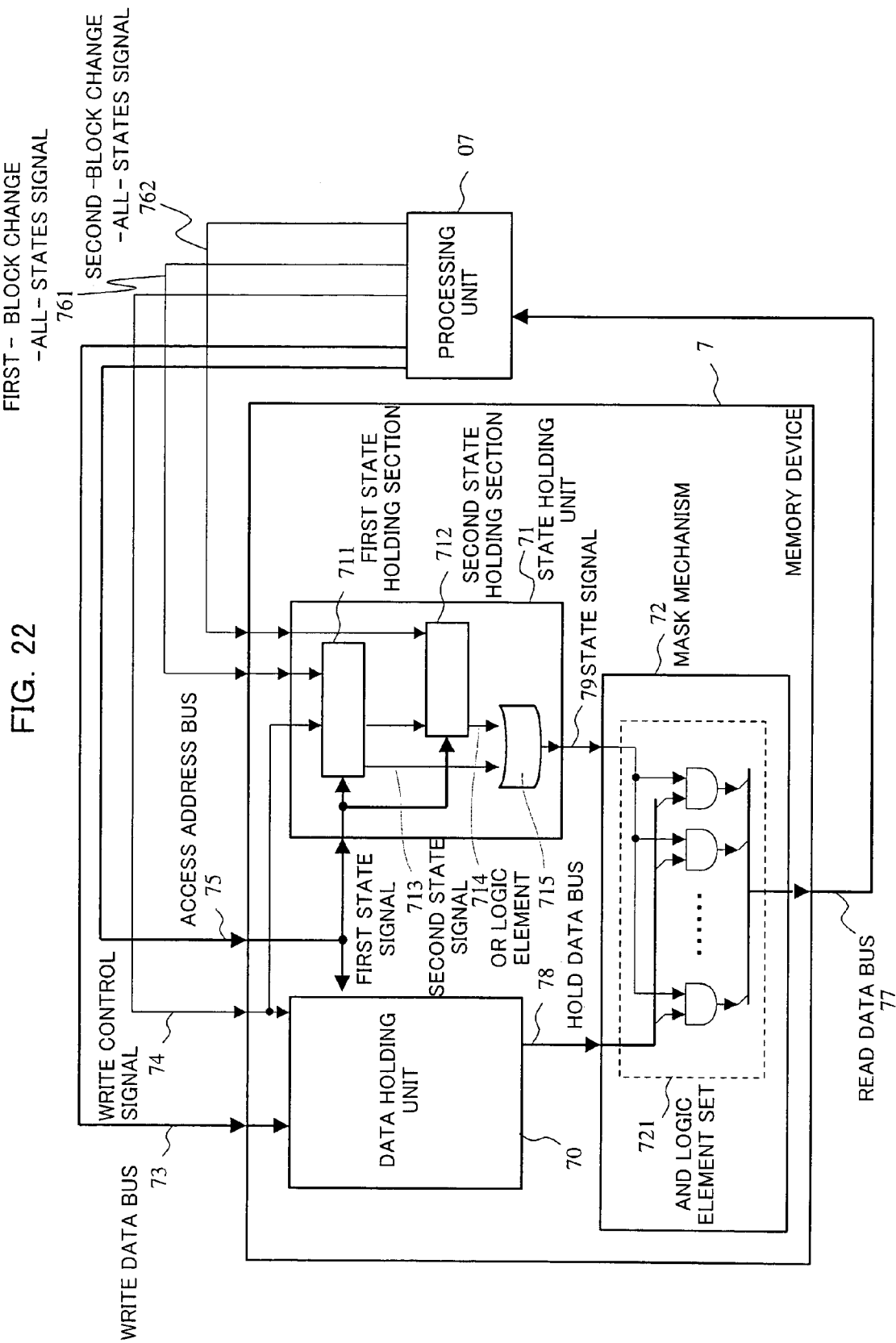
FIG. 22 is a block diagram showing a configuration of a memory device according to a fourth embodiment of the present invention.

FIG. 22 shows a memory device as well as a processing unit 07 for controlling the memory device. The fourth embodiment differs from the first embodiment in that first and second state holding sections 711 and 712 and an OR logic element 715 are provided in a state holding unit 71 in order to allow a value held in a state holding unit 51 to be changed.

The processing unit 07 performs a number of processes within it and, when information store or read is required, stores or reads information in the memory device 7 through a write data bus 73, a write control signal 74, an access address bus 75, a first-block change-all-states signal 761, a second-block change-all-states signal 762, and a read data bus 77. When reset, the control unit 07 enables the second-block change-all-states signal 762.

The memory device 7 includes a data holding unit 70, a state holding unit 71, and a mask mechanism 72. The mask mechanism 72 includes a set of AND logic elements 721.

The memory device 7 has the write data bus 73, write control signal 74, access address bus 75, first-block changeall-states signal 761, and second-block change-all-states signal 762 as its inputs and has the read data bus 77 as its output.

The data holding unit 70 has the write data bus 73, write control signal 74, and access address bus 75 as its inputs and has a hold data bus 78 as its output.

The state holding unit 71 has the first-block change-all-states signal 761, second-block change-all-states signal 762, write control signal 74, and access address bus 75 as its inputs. The state holding unit 71 includes a first state holding section 711, a second state holding section 712, a first state signal 713, a second state signal 714, and an OR logic element 715 and has a state signal 79 as its output.

The mask mechanism 72 has the hold data bus 78, which is the output of the data holding unit 70, and the state signal 79, which is the output of the state holding unit 71, as its inputs and has the read data bus 77 as its output.

The AND logic element set 721 has the hold data bus 78, which is an input to the mask mechanism 72, and the state signal 79 as its inputs and outputs data onto the read data bus 77.

The data holding unit 70 is a readable and writable memory device which uses a value provided through the access address bus 75 as an address and outputs a value stored in a multiple-bit-wide memory area associated with that address onto the hold data bus 78. Also, a value provided through the write data bus 73 is stored in a multiple-bit-wide memory area in the data holding unit 70 that is associated with an address indicated through the access address bus 75 when the write control signal 74 is enabled. It is assumed in this exemplary configuration that the data holding unit 70 has eight memory areas, addresses 00 through 07, for purpose of illustration.

The state holding unit 71 is a readable and writable memory device including a combination of a first state holding section 711 and a second state holding section 712, which provides as many single-bit-wide memory areas as the number of the memory areas in the data holding unit 70. Whether or not the write control signal 74 is enabled, the values held in the memory areas in the first state holding section 711 are changed to "0" when the first-block change-all-states signal 761 is enabled. Likewise, whether or not the write control signal 74 is enabled, the values held in the memory areas in the second state holding section 712 are changed to "0" when the second-block change-all-states signal 762 is enabled.

When the write control signal 74 is enabled, a value provided through the access address bus 75 is used as an address to change the value held in the memory area associated with the access address, which is in the first or second state holding section 711 or 712, to "1."

Hereinafter the state in which the value held in a memory area in the state holding unit 71 is "0" is called the inhibit state and the state in which the value "1" is held in a memory area is called the permit state.

In this exemplary configuration, it is assumed that the first state holding section 711 is responsible for holding the states of the memory areas associated with addresses 00 through 03 and the second state holding section 712 is responsible for holding the states of the memory areas corresponding to addresses 04 through 07, for purpose of illustration.

If the value provided through the access address bus 75 is an address for which the first state holding section 711 is responsible, the first state holding section 711 outputs a state signal for that address onto the first state signal 713. Otherwise, it outputs 0.

Likewise, if the value provided through the access address bus 75 is an address for which the second state holding section 712 is responsible, the second state holding section 712 outputs a state signal for that address onto the second state signal 714. Otherwise, it outputs 0.

The OR logic element 715 outputs the result of OR operation between the first state signal 713 and the second state signal 714 as a state signal 79.

In the mask mechanism 72, the set of AND logic elements 721 carries out the AND operation between each bit from the hold data bus 78 and the state signal 79 and outputs the result onto the read data bus 77.

Operation in which the memory device shown in FIG. 22 is used to perform a process sequence shown in FIG. 23 will be described below.

Figure 23:
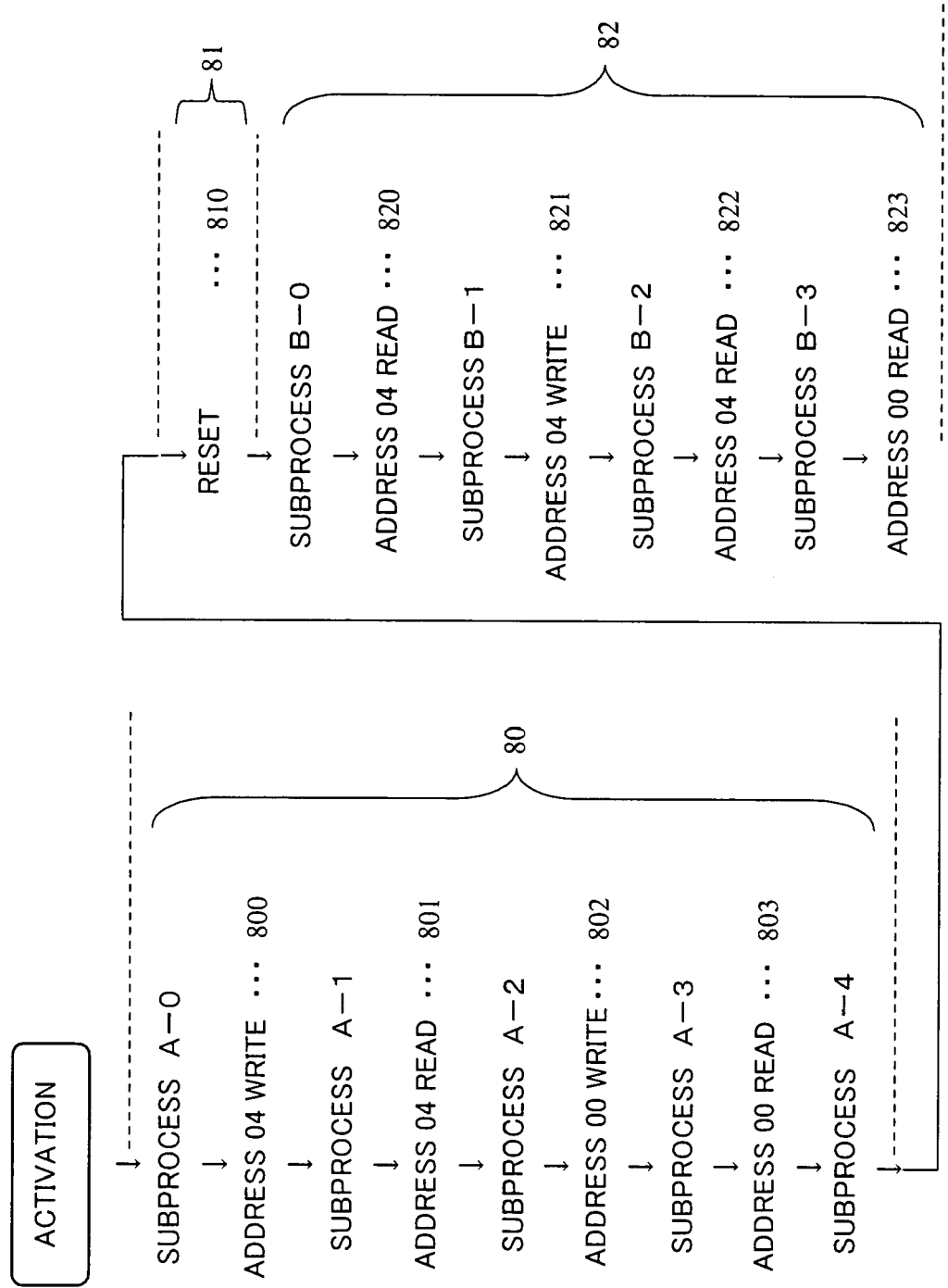
FIG. 23 is a flowchart of a process performed in a processing unit 07 according to the fourth embodiment.

FIG. 23 shows process A 80, a reset sequence 81, and process B 82, which are performed by the processing unit 07 in sequence.

In process A 80, subprocess A-0, a write 800 to address 04, subprocess A-1, a read 801 from address 04, subprocess A-2, a write 802 to address 00, subprocess A-3, a read 803 from address 00, and subprocess A-4 are performed in sequence.

In the reset sequence 81, the processing unit 07 is reset.

In process B 82, subprocess B-0, a read 820 from address 04, subprocess B-1, a write 821 to address 04, subprocess B-2, a read 822 from address 04, subprocess B-3, and a read 823 from address 00 are performed in sequence.

Subprocesses A-0, A-1, A-2, A-3, A-4, B-0, B-1, B-2, and B-3 represent operations that do not involve access to the memory device 7 by the processing unit 07.

FIG. 24 shows internal states of the data holding unit 70 and the state holding unit 71 immediately after activation of the processing unit 07.

Any values may be held in the data holding unit 70 and all values held in the state holding unit 71 are indicating the inhibit state.

FIG. 25 shows internal states of the data holding unit 70 and the state holding unit 71 after the completion of a write 800 to address 04, which is an operation in process A 80.

When a value from the write data bus 73 is stored in the memory area in the data holding unit 70 associated with address 04 by a write 800 to address 04, the memory area corresponding to address 04, which is found in the second state holding section 712 in the state holding unit 71, holds "1" indicating the permit state.

Execution of an address 04 read 801, which is an operation in process A 80, will be described below.

When an address 04 read 801 is performed, the memory area in the data holding unit 70 associated with address 04 contains a value written by the write 800 to address 04. Accordingly, the value written by the address 04 write 800 is read out onto the hold data bus 78.

Because the value "1" indicating the permit state is held in the memory area in the second state holding section 712 in the state holding unit 71 that corresponds to address 04, "1" is outputted onto the state signal 79 through the OR logic element 715.

Thus, the same value as that on the hold data bus 78 is outputted onto the read data bus 77 as a result of AND operations performed by the set of AND logic elements 721. Therefore the value written by the write 800 to address 04 can be read.

FIG. 26 shows internal states of the data holding unit 70 and the state holding unit 71 after the completion of a write 802 to address 00, which is an operation in process A 80.

When a value from the write data bus 73 is stored in the memory area in the data holding unit 70 associated with address 00 by a write 802 to address 00, the memory area corresponding to address 00, which is found in the first state holding section 711 in the state holding unit 71, holds "1" indicating the permit state.

Execution of an address 00 read 803, which is an operation in process A 80, will be described below.

When an address 00 read 803 is performed, the memory area in the data holding unit 70 associated with address 00 contains a value written by the write 802 to address 00. Accordingly, the value written by the address 00 write 802 is read out onto the hold data bus 78.

Because the value "1" indicating the permit state is held in the memory area in the first state holding section 711 in the state holding unit 71 that corresponds to address 00, "1" is outputted onto the state signal 79 through the OR logic element 715.

Thus, the same value as that on the hold data bus 78 is outputted onto the read data bus 77 as a result of AND operations performed by the set of AND logic elements 721. Therefore the value written by the write 802 to address 00 can be read.

FIG. 27 shows internal states of the data holding unit 70 and the state holding unit 71 after the completion of a reset sequence 81.

In the reset sequence, the second-block change-all-states signal 762 is enabled by the processing unit 07 and as a result all the values held in the second state holding section 712 are changed to "0" indicating the inhibit state whereas the values in the data holding unit 70 are not changed in the memory device 7. That is, the states of address 04 through address 07 in the state holding unit 71 change to "0" indicating the inhibit state.

Execution of a read 820 to address 04, which is an operation in process B 82, will be described below.

When the address 04 read 820 is performed, the memory area in the data holding unit 70 associated with address 04 contains a value written by the write 800 to address 04. Accordingly, the value written by the address 04 write 800 is read out onto the hold data bus 78.

However, because the value "0" indicating the inhibit state is held in the memory area in the second state holding section 712 in the state holding unit 71 that corresponds to address 04 because of the execution of the reset sequence 81, "0" is output onto the state signal 79 through the second state signal 714.

Thus, the AND logic element set 721 outputs a value different from the value on the hold data bus 78 onto the read data bus 77 as a result of AND operations, therefore the value written by address 04 write 800 cannot be read.

FIG. 28 shows internal states of the data holding unit 70 and the state holding unit 71 after the completion of a write 821 to address 04, which is an operation in process B 22.

When a value from the write data bus 73 is stored in the memory area in the data holding unit 70 associated with address 04 by a write 821 to address 04, the memory area corresponding to address 04, which is found in the second state holding section 712 in the state holding unit 71, holds "1" indicating the permit state.

Consequently, the value that was stored in the memory area in the data holding unit 70 associated with address 04 by an address 04 write 800, which is an operation in process A 80, is destroyed and the value written by the address 04 write 821, which is an operation in process B 82, is held in that memory area.

A read 822 from address 04, which is an operation in process B 82, will be described below.

When the address 04 read 822 is performed, the memory area in the data holding unit 70 associated with address 04 contains a value written by the write 821 to address 04. Accordingly, the value written by the address 04 write 821 is read out onto the hold data bus 78.

Because the value "1" indicating the permit state is held in the memory area in the second state holding section 712 in the state holding unit 71 that corresponds to address 04, "1" is outputted onto the state signal 79 through the OR logic element 715.

Thus, the same value as that on the hold data bus 78 is outputted onto the read data bus 77 as a result of AND operations performed by the set of AND logic elements 721. Therefore the value written by the write 821 to address 04 can be read.

An address 00 read 823, which is an operation in process B 82, will be described below. Although the reset sequence 81 has been performed, the values in the first state holding section 711 have not been changed by the reset sequence because the reset sequence forces only the information in the second state holding section 712 to be "0" indicating the inhibit state.

When the address 00 read 822 is performed, the memory area in the data holding unit 70 associated with address 00 contains a value written by the write 802 to address 00. Accordingly, the value written by the address 00 write 802 is read out onto the hold data bus 78.

Because the value "1" indicating the permit state is held in the memory area in the first state holding section 711 in the state holding unit 71 that corresponds to address 00, "1" is outputted onto the state signal 79 through the OR logic element 715.

Thus, the same value as that on the hold data bus 78 is outputted onto the read data bus 77 as a result of AND operations performed by the set of AND logic elements 721. Therefore, the value written by the write 802 to address 00, that is, the process performed before the reset sequence, can be read.

As described above, the memory device according to the present embodiment can provide a section from which information stored by a process performed previously cannot be read by a process performed after a reset and another section from which such information can be read. This allows security to be ensured while providing flexibility of the memory as a data passing area.

While the state holding unit 71 in the fourth embodiment has the two state holding sections, first and second state holding sections 711 and 712, a configuration can also be implemented in which more than two outputs of a holding unit are provided to a logic element such as the logic element 715.

The fourth embodiment can be implemented in the second or third embodiment as well as the first embodiment.

(Fifth Embodiment)

FIGS. 29 to 33 show a fifth embodiment of the present invention.

Figure 29:
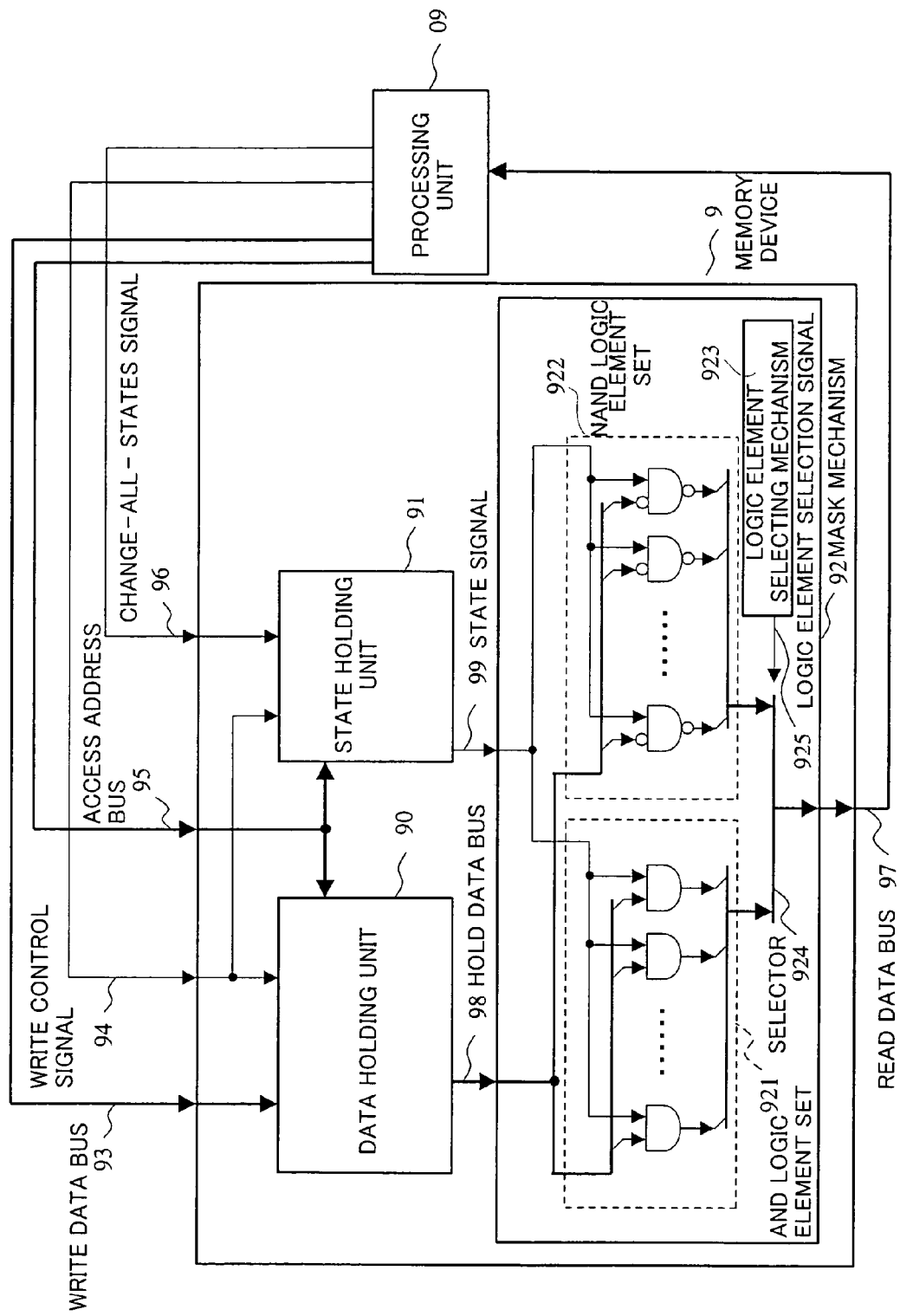
FIG. 29 is a block diagram showing a configuration of a memory device according to a fifth embodiment of the present invention.

FIG. 29 shows a memory device as well as a processing unit 09 for controlling the memory device. The fifth embodiment differs from the first embodiment in that a mask mechanism 92 includes first and second sets of logic elements.

The processing unit 09 performs a number of processes within it and, when information store or read is required, stores or reads information in the memory device 9 through a write data bus 93, a write control signal 94, an access address bus 95, a change-all-states signal 96, and a read data bus. When reset, the control unit 09 enables the change-all-states signal 96.

The memory device 9 includes a data holding unit 90, a state holding unit 91, and a mask mechanism 92.

The mask mechanism 92 includes a set of AND logic elements 921, a set of NAND logic elements 922, a logic element selecting mechanism 923, and a selector 924.

The memory device 9 has the write data bus 93, write control signal 94, access address bus 95, and change-all-states signal 96 as its inputs and has the read data bus 97 as its output.

The data holding unit 90 has the write data bus 93, write control signal 94, and access address bus 95 as its inputs and has a hold data bus 98 as its output.

The state holding unit 91 has the change-all-states signal 96, write control signal 94, and access address bus 95 as its inputs and has a state signal 99 as its output.

The mask mechanism 92 has the hold data bus 98, which is the output of the data holding unit 90, and the state signal 99, which is the output of the state holding unit 91, as its inputs and has the read data bus 97 as its output.

The AND logic element set 921 has the hold data bus 98, which is an input to the mask mechanism 92, and the state signal 99 as its inputs and outputs data to the selector 924.

The NAND logic element set 922 has the hold data bus 98, which is an input to the mask mechanism 92, and state signal 99 as its inputs and outputs data to the selector 924.

The logic element selecting mechanism 923 provides a random value to the selector 924 as a logic element selection signal 925.

The selector 924 has the output of the AND logic element set 921, the output of the NAND logic element set 922, and the logic element selection signal 925 as its inputs. The selector 924 selects the output of the AND logic element set 921 when the logic element selection signal 925 is "0" or selects the output of the NAND logic element set 922 when the logic element selection signal 925 is "1" and outputs data onto the read data bus 97.

The data holding unit 90 is a readable and writable memory device which uses a value provided through the access address bus 95 as an address and outputs a value stored in a multiple-bit-wide memory area associated with that address onto the hold data bus 98. Also, a value provided through the write data bus 93 is stored in a multiple-bit-wide memory area in the data holding unit 90 that is associated with an address indicated through the access address bus 95 when the write control signal 94 is enabled.

The state holding unit 91 is a readable and writable memory device including as many single-bit-wide memory areas as the number of the memory areas in the data holding unit 90. Whether or not the write control signal 94 is enabled, all the values held in the memory areas in the state holding unit 91 are changed to "0" when the change-all-states signal 96 is enabled. When the write control signal 94 is enabled, a value provided through the access address bus 95 is used as an address to change the value held in the memory area associated with the address to "1." Hereinafter the state in which the value held in a memory area in the state holding unit 91 is "0" is called the inhibit state and the state in which the value "1" is held in a memory area is called the permit state.

In the mask mechanism 92, the AND logic element set 921 and the NAND logic element set 922 carry out logic operations between each bit from the hold data bus 98 and the state signal 99 and output the results onto the read data bus 97 through the selector 924 using logic element selection signal 925 (an output of the logic element selecting mechanism 923) as a control signal.

Operation in which the memory device shown in FIG. 29 is used to perform a process sequence shown in FIG. 30 will be described below.

Figure 30:
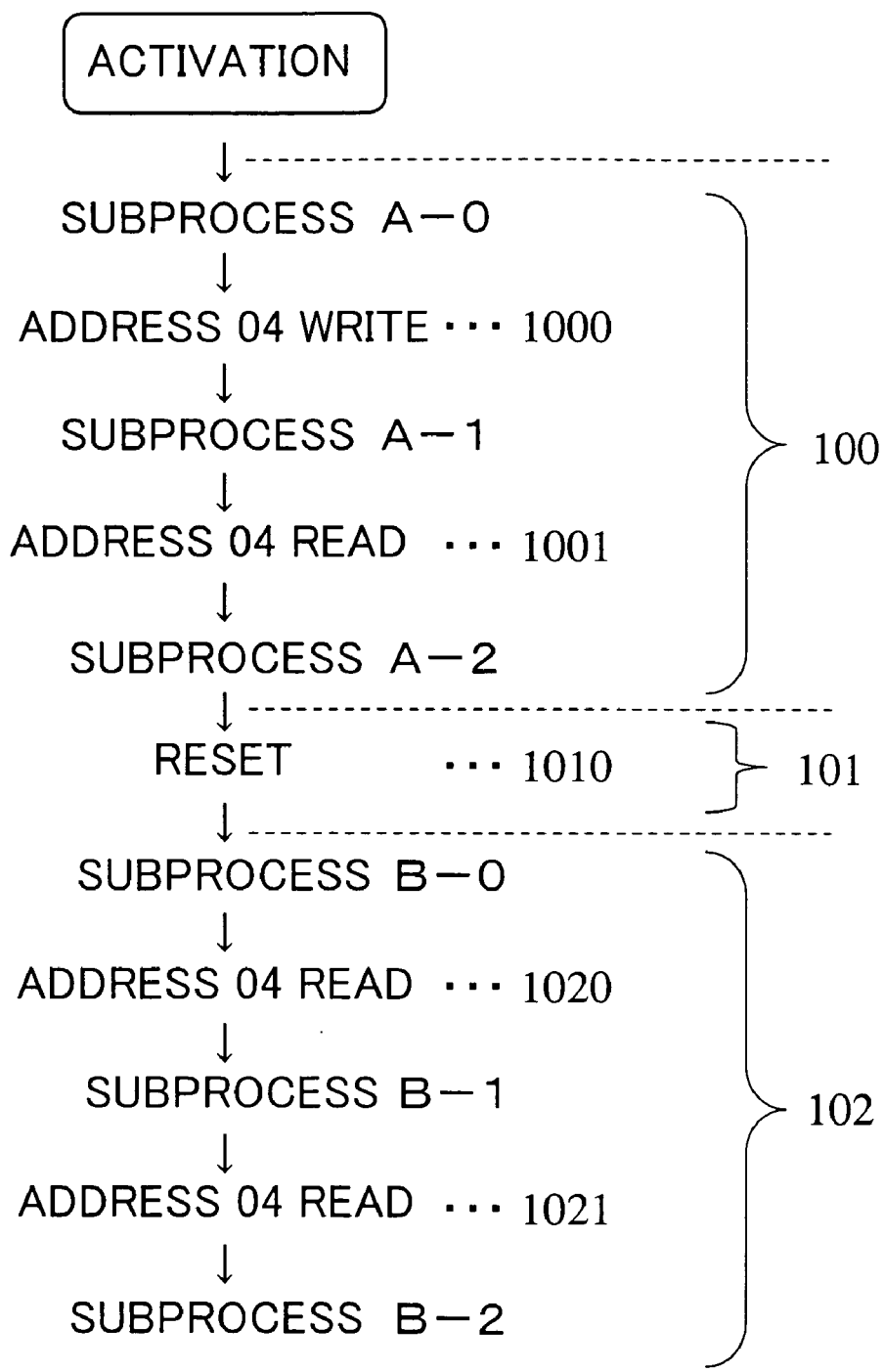
FIG. 30 is a flowchart of a process performed in a processing unit 09 according to the fifth embodiment.

FIG. 30 shows process A indicated by reference numeral 100, a reset sequence 101, and process B indicated by reference numeral 102, which are performed by the processing unit 09 in sequence.

In process A 100, subprocess A-0, a write 1000 to address 04, subprocess A-1, a read 1001 from address 04, and subprocess A-2 are performed in sequence.

In the reset sequence 101, the processing unit is reset.

In process B indicated by reference numeral 102, subprocess B-0, a read 1020 from address 04, subprocess B-1, and a read 1021 from address 04 are performed in sequence.

Subprocesses A-0, A-1, A-2, B-0, B-1, and B-2 represent operations that do not involve access to the memory device 9 by the processing unit 09.

FIG. 30 shows internal states of the data holding unit 90 and the state holding unit 91 immediately after activation of the processing unit 09.

Any values may be held in the data holding unit 90 and all values held in the state holding unit 91 are indicating the inhibit state.

FIG. 31 shows internal states of the data holding unit 90 and the state holding unit 91 after the completion of a write 1000 to address 04, which is an operation in process A 100.

When a value from the write data bus 93 is stored in the memory area in the data holding unit 90 associated with address 04 by a write 1000 to address 04, the value stored in the memory area in the state holding unit 91 that corresponds to address 04 holds at the same time the permit state "1."

Execution of an address 04 read 1001, which is an operation in process A 100, will be described below.

When an address 04 read 1001 is performed, the memory area in the data holding unit 90 associated with address 04 contains a value written by the write 1000 to address 04. Accordingly, the value written by the address 04 write 1000 is read out onto the hold data bus 98.

Because the value "1" indicating the permit state is held in the memory area in the state holding unit 91 that corresponds to address 04, "1" is outputted onto the state signal 99.

Thus, the same value as that on the hold data bus 98 appears at both outputs of the AND logic element set 921 and NAND logic element set 922. Therefore the value written by the write 1000 to address 04 can be read.

FIG. 33 shows internal states of the data holding unit 90 and the state holding unit 91 after the completion of the reset sequence 101.

In the reset sequence, the change-all-states signal 96 is enabled by the processing unit 09 and as a result all values held in the state holding unit 91 are changed to the inhibit state "0" whereas the values in the data holding unit 90 are not changed in the memory device 9.

An address 04 read 1020, which is an operation in process B 102, will be described below.

When an address 04 read 1020 is performed, the memory area in the data holding unit 90 associated with address 04 contains a value written by the write 1000 to address 04. Accordingly, the value written by the address 04 write 1000 is read out onto the hold data bus 98.

However, the memory area in the state holding unit 91 that corresponds to address 04 contains the inhibit state "0" because of the execution of the reset sequence 101, therefore "0" is outputted onto the state signal 99.

At this point, the output of the AND logic element set 921 or the output of the NAND logic element set 922 is selected, depending on the value of the logic element selection signal 925, which is provided from the logic element selecting mechanism 923. Regardless of the value of the logic element selection signal 925, a value different from the one on the hold data bus 98 is outputted onto the read data bus 97 as a result of the AND operation. Thus, the value written by the address 04 write 1000 cannot be read. For example, if "0" is outputted onto the logic element selection signal 925 as a random value, the output of the AND logic element set 921 is selected by the selector and consequently data concatenated with 0 will be outputted onto the read data bus 97.

An address 04 read 1021, which is an operation in process B 102, will be described below. It is assumed here that "1" is provided onto the logic element selection signal 925 as a random value. When the address 04 read 1021 is performed, the memory area in the data holding unit 90 associated with address 04 contains the value written by the address 04 write 1000. Therefore, the value written by the address 04 write 1000 is outputted onto the hold data bus 98.

However, the memory area in the state holding unit 91 that corresponds to address 04 contains the inhibit state " " because of the execution of the reset sequence 101, therefore "0" is outputted onto the state signal 99.

Here, because the value of the logic element selection signal 925 provided from the logic element selecting mechanism 923 is "1," the output of the NAND logic element set 922 is selected by the selector. Therefore, data concatenated with "1" is outputted onto the read data bus 97.

As described above, the memory device according to the present embodiment prevents information stored by a previously performed process from being read by a process performed after a reset. Furthermore, because more than one piece of inhibited read data can be generated, the analysis of the structure of the internal circuit from read data can be made more difficult.

While the mask mechanism 92 according to the fifth embodiment includes the two logic element sets 921 and 922, a mask mechanism including more than two logic element sets may also be implemented.

The fifth embodiment can be implemented in the second, third, or fourth embodiment as well as the first embodiment.

(Sixth Embodiment)

FIGS. 34 to 39 show a sixth embodiment of the present invention.

Figure 34:
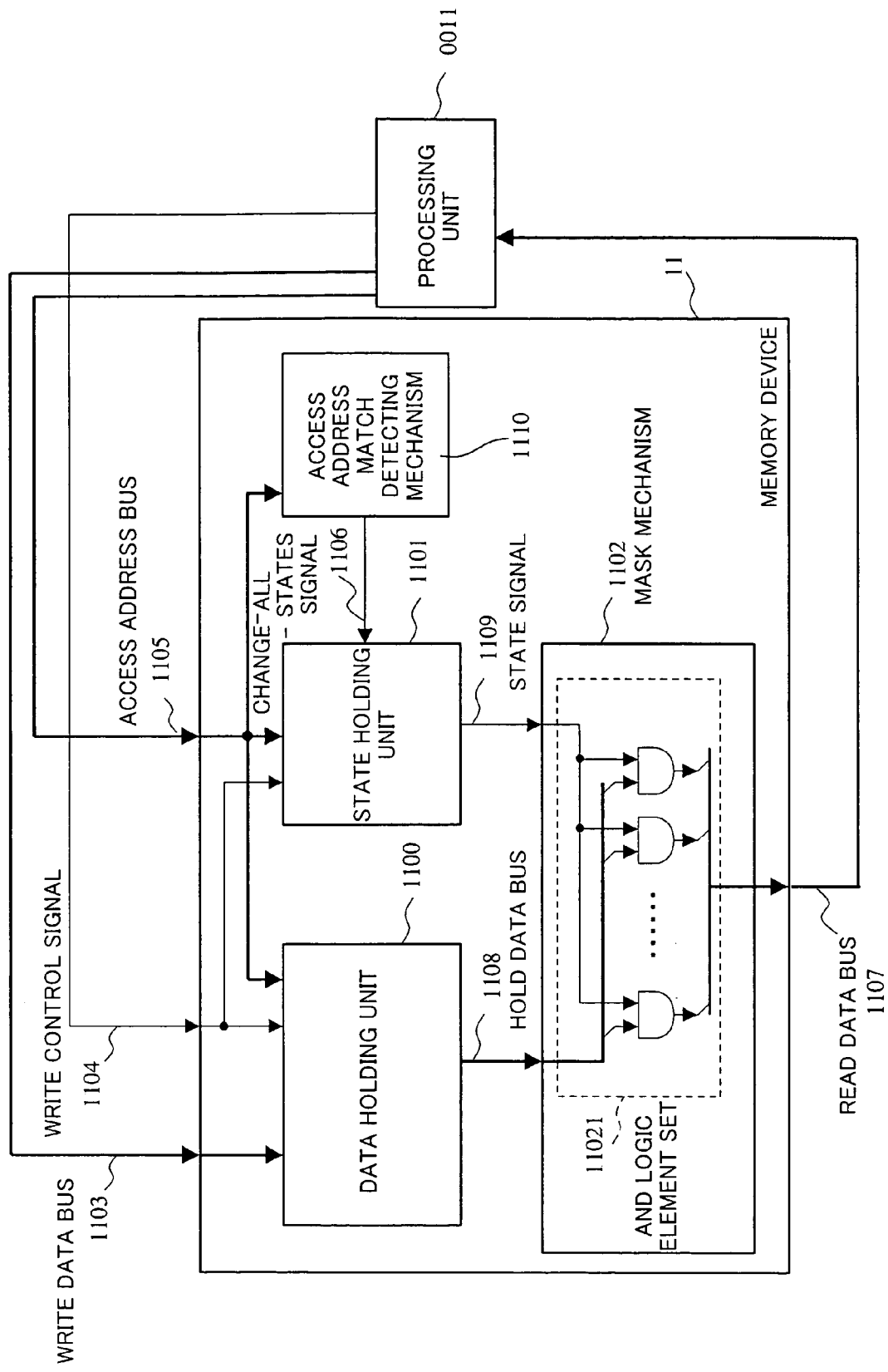
FIG. 34 is a block diagram showing a configuration of a memory device according to a sixth embodiment of the present invention.

FIG. 34 shows a memory device as well as a processing unit 0011 for controlling the memory device. The sixth embodiment differs from the first embodiment in that an access address match detecting mechanism 1110 that detects a specific address for accessing a data holding unit 1100 is provided and a signal from the access address match detecting mechanism 1110 can be used to change all values in a state holding unit that holds write states of write addresses.

The processing unit 0011 performs a number of processes within it and, when information store or read is required, stores or reads the information in the memory device 11 through a write data bus 1103, a write control signal 1104, an access address bus 1105, and a read data bus 1107.

The memory device 11 includes a data holding unit 1100, a state holding unit 1101, an access address match detecting mechanism 1110, and a mask mechanism 1102. The mask mechanism 1102 consists of a set of AND logic elements 11021.

The memory device 11 has the write data bus 1103, write control signal 1104 and access address bus 1105 as its inputs and has the read data bus 1107 as its output.

The data holding unit 1100 has the write data bus 1103, write control signal 1104, and access address bus 1105 as its inputs and has the hold data bus 1108 as its output.

The state holding unit 1101 has the change-all-states signal 1106, write control signal 1104, and access address bus 1105 as its inputs and has the state signal 1109 as its output.

The mask mechanism 1102 has the hold data bus 1108, which is the output of the data holding unit 1100, and the state signal 1109, which is the output of the state holding unit 1101, as its inputs and has the read data bus 1107 as its output.

The AND logic element set 11021 has the hold data bus 1108, which is an input to the mask mechanism 1102, and the state signal 1109 as its inputs and outputs data onto the read data bus 1107.

The access address match detecting mechanism 1110 has the access address bus 1105 as its input and has the change-all-states signal 1106 as its output.

The data holding unit 1100 is a readable and writable memory device, which uses a value provided through the access address bus 1105 as an address and outputs a value stored in a multiple-bit-wide memory area associated with that address onto the hold data bus 1108. The data holding unit 1100 stores a value provided through the write data bus 1103 in a multiple-bit-wide memory area associated with an address indicated through the access address bus 1105 when the write control signal 1104 is enabled.

The state holding unit 1101 is a readable and writable memory device consisting of as many single-bit-wide memory areas as the number of the memory areas in the data holding unit 1100. Whether or not the write control signal 1104 is enabled, all the values held in the memory areas in the state holding unit 1101 are changed to "0" when the change-all-states signal 1106 is enabled. When the write control signal 1104 is enabled, a value provided through the access address bus 1105 is used as an address to change the value held in the memory area associated with the address to "1." Hereinafter the state in which the value held in a memory area in the state holding unit 1101 is "0" is called the inhibit state and the state in which the value "1" is held in a memory area is called the permit state.

In the mask mechanism 1102, the set of AND logic elements 11021 carries out the AND operation between each bit from the hold data bus 1108 and the state signal 1109 and outputs the result onto the read data bus 1107.

The access address match detecting mechanism 1110 outputs onto the change-all-states signal 1106 a value indicating an enable if the value provided through the access address bus 1105 matches a predetermined value. It outputs onto the change-all-states signal 1106 a value indicating a disable if the value provided through the access address bus 1105 does not match the predetermined value. It is assumed in this example that the predetermined value is "07."

Operation in which the memory device shown in FIG. 34 is used to perform a process sequence shown in FIG. 35 will be described below.

Figure 35:
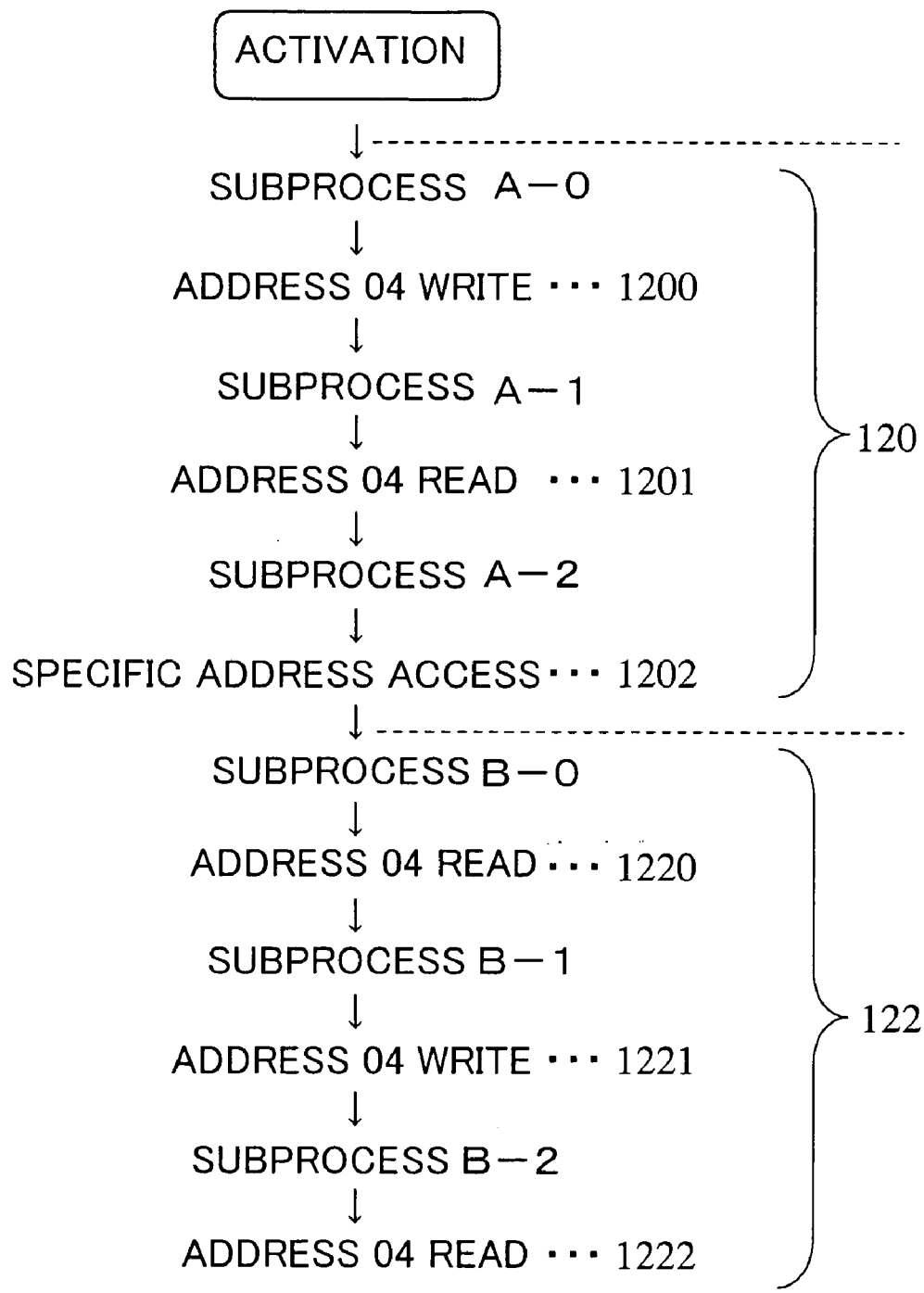
FIG. 35 is a flowchart of a process performed in a processing unit 0011 according to the sixth embodiment.

FIG. 35 shows process A indicated by reference numeral 120 and process B indicated by reference numeral 122, which are performed by the processing unit 0011 in sequence.

In process A indicated by reference numeral 120, subprocess A-0, a write 1200 to address 04, subprocess A-1, a read 1201 from address 04, subprocess A-2, and an access 1202 to a specific address (07) are performed in sequence.

In process B indicated by reference numeral 122, subprocess B-0, a read 1220 from address 04, subprocess B-1, a write 1221 to address 04, subprocess B-2, and a read 1222 from address 04 are performed in sequence.

Subprocesses A-0, A-1, A-2, B-0, B-1, and B-2 represent subprocesses that do not involve accesses to the memory device 11 by the processing unit 0011.

FIG. 36 shows internal states of the data holding unit 1100 and the state holding unit 1101 immediately after the processing unit 0011 is activated.

Any values may be held in the data holding unit 1100 and all values held in the state holding unit 1101 are indicating the inhibit state.

FIG. 36 shows internal states of the data holding unit 1100 and the state holding unit 1101 after the address 04 write 1200, which is an operation in process A 120, is performed.

On completion of address 04 write 1200, a value from the write data bus 1103 is stored in the memory area in the data holding unit 1100 that is associated with address 04 while the value stored in the memory area in the state holding unit 1101 corresponding to address 04 holds the permit state "1."

Execution of an address 04 read 1201, which is an operation in process A 120, will be described below.

When an address 04 read 1201 is performed, the memory area in the data holding unit 1100 associated with address 04 contains a value written by the address 04 write 1200. Accordingly, the value written by the address 04 write 1200 is read out onto the hold data bus 1108.

The memory area in the state holding unit 1101 that corresponds to address 04 contains the permit state "1" and therefore the value "1" is outputted onto the state signal 1109.

Thus, the same value as the value on the hold data bus 1108 is outputted onto the read data bus 1107 as a result of AND operations performed by the set of AND logic elements 11021. In this way, the value written by the write 1200 to address 04 can be read out.

A read 1202 from a specific address (07), which is an operation in process A 120, will be described below.

FIG. 38 shows internal states of the data holding unit 1100 and the state holding unit 1101 after the completion of the read.

Because the value of the access address bus is 07, the access address match detecting mechanism enables the change-all-states signal 1106. Consequently, all the values held in the state holding unit 1101 are changed to "0" indicating the inhibit state whereas the values in the data holding unit 1100 are not changed in the memory device 11.

A read 1220 from address 04, which is an operation in process B 122, will be described below.

When an address 04 read 1220 is performed, the memory area in the data holding unit 1100 associated with address 04 contains a value written by the write 1200 to address 04. Accordingly, the value written by the address 04 write 1200 is read out onto the hold data bus 1108.

However, the memory area in the state holding unit 1101 that corresponds to address 04 contains the inhibit state "0" as a result of the access 1202 to the specific address, therefore "0" is outputted onto the state signal 1109.

Thus, a different value than the value on the hold data bus 1108 is outputted onto the read data bus 1107 as a result of AND operations performed by the set of AND logic elements 11021. Therefore, the value written by the write 1200 to address 04 cannot be read.

FIG. 39 shows internal states of the data holding unit 1100 and the state holding unit 1101 after the completion of the write 1221 to address 04, which is an operation in process B 122.

When a value from the write data bus 1103 is stored in the memory area in the data holding unit 1100 associated with address 04 by a write 1221 to address 04, the value stored in the memory area in the state holding unit 1101 that corresponds to address 04 holds at the same time the permit state "1."

Consequently, the value that was stored in the memory area in the data holding unit 1100 associated with address 04 by an address 04 write 1200, which is an operation in process A 120, is destroyed and the value written by the address 04 write 1221, which is an operation in process B 122, is held in that memory area.

A read 1222 from address 04, which is an operation in process B 122, will be described below.

When an address 04 read 1222 is performed, the memory area in the data holding unit 1100 associated with address 04 contains a value written by a write 1221 to address 04 and accordingly the value written by the address 04 write 1221 is read out onto the hold data bus 1108.

The memory area in the state holding unit 1101 that corresponds to address 04 contains the permit state "1" and therefore "1" is outputted onto the state signal 1109.

Thus, the same value as the value on the hold data bus 1108 is outputted onto the read data bus 1107 as a result of AND operations performed by the set of AND logic elements 11021. In this way, the value written by the address 04 write 1221 can be read.

As described above, the memory device according to the present embodiment prevents information stored by a process performed previously from being read by a subsequent process without having to use any change-all-states signal, such as a reset signal, from an external source.

The sixth embodiment can be implemented in the second, third, fourth, or fifth embodiment as well as the first embodiment.

(Seventh Embodiment)

FIGS. 40 to 45 show a seventh embodiment of the present invention.

Figure 40:
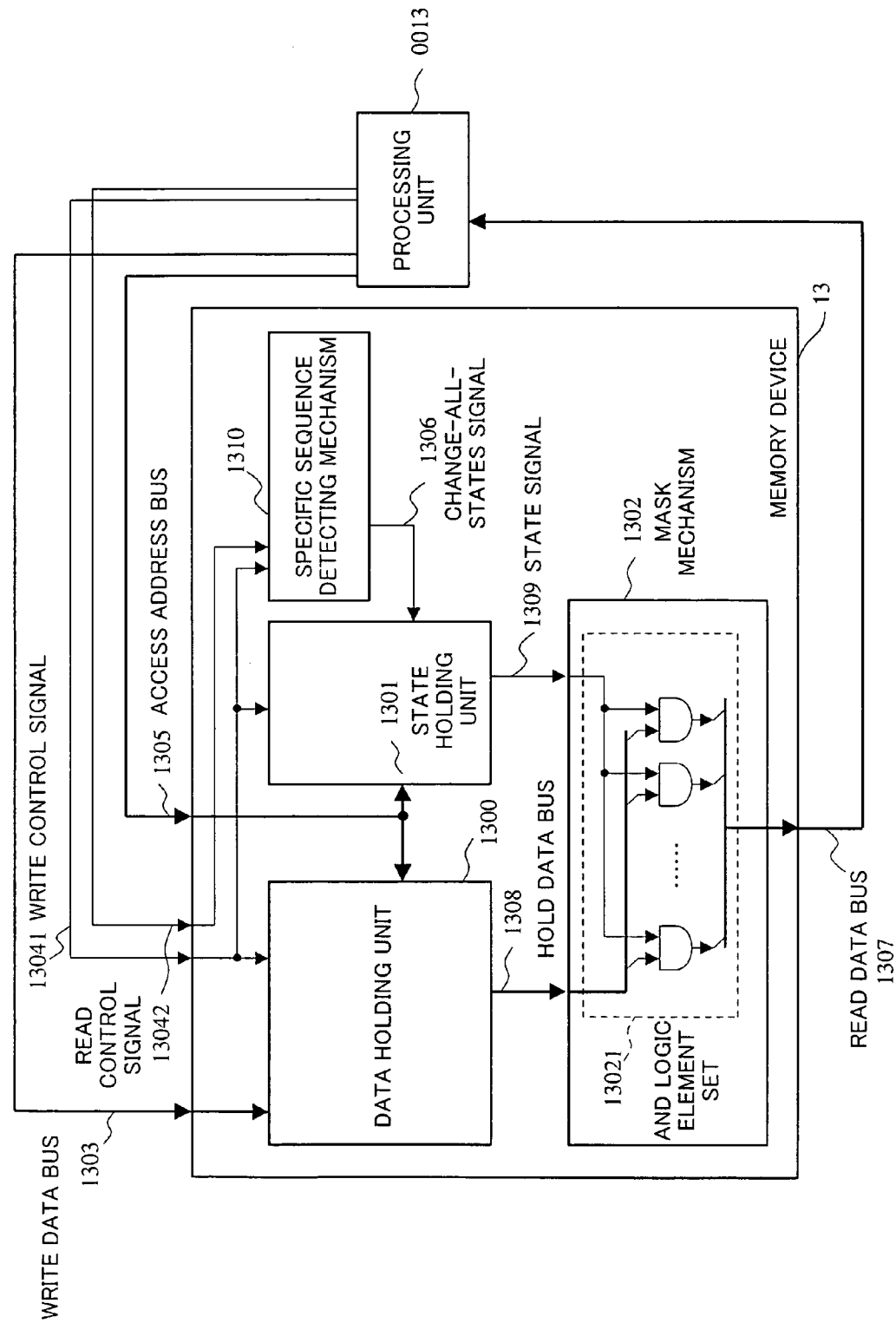
FIG. 40 is a block diagram showing a configuration of a memory device according to a seventh embodiment of the present invention.

FIG. 40 shows a memory device as well as a processing unit 0013 for controlling the memory device. The seventh embodiment differs from the first embodiment in that a specific sequence detecting mechanism 1310 for detecting a specific pattern of access to a data holding unit 1300 is provided and a signal from the specific sequence detecting mechanism 1310 can be used to change all values in a state holding unit 1301 that holds write states of write addresses.

The processing unit 0013 performs a number of processes within it and, when information store or read is required, stores or reads the information in the memory device 13 through a write data bus 1303, a write control signal 13041, an access address bus 1305, a change-all-states signal 1106, and a read data bus 1307.

The memory device 13 includes a data holding unit 1300, a state holding unit 1301, a specific sequence detecting mechanism 1310, and a mask mechanism 1302. The mask mechanism 1302 consists of a set of AND logic elements 13021.

The memory device 13 has the write data bus 1303, write control signal 13041 and access address bus 1305 as its inputs and has the read data bus 1307 as its output.

The data holding unit 1300 has the write data bus 1303, write control signal 13041, and access address bus 1305 as its inputs and has the hold data bus 1308 as its output.

The state holding unit 1301 has the change-all-states signal 1306, write control signal 13041, and access address bus 1305 as its inputs and has the state signal 1309 as its output.

The mask mechanism 1302 has the hold data bus 1308, which is the output of the data holding unit 1300, and the state signal 1309, which is the output of the state holding unit 1301, as its inputs and has the read data bus 1307 as its output.

The AND logic element set 13021 has the hold data bus 1308, which is an input to the mask mechanism 1302, and the state signal 1309 as its inputs and outputs data onto the read data bus 1307.

The specific sequence detecting mechanism 1310 has the access address bus 1305 as its input and has the change-all-states signal 1306 as its output.

The data holding unit 1300 is a readable and writable memory device, which uses a value provided through the access address bus 1305 as an address and outputs a value stored in a multiple-bit-wide memory area associated with that address onto the hold data bus 1308. The data holding unit 1300 stores a value provided through the write data bus 1303 in a multiple-bit-wide memory area associated with an address indicated through the access address bus 1305 when the write control signal 13041 is enabled.

The state holding unit 1301 is a readable and writable memory device consisting of as many single-bit-wide memory areas as the number of the memory areas in the data holding unit 1300. Whether or not the write control signal 13041 is enabled, all the values held in the memory areas in the state holding unit 1301 are changed to "0" when the change-all-states signal 1306 is enabled. When the write control signal 13041 is enabled, a value provided through the access address bus 1305 is used as an address to change the value held in the memory area associated with the address to "1." Hereinafter the state in which the value held in a memory area in the state holding unit 1301 is "0" is called the inhibit state and the state in which the value "1" is held in a memory area is called the permit state.

In the mask mechanism 1302, the set of AND logic elements 13021 carries out the AND operation between each bit from the hold data bus 1308 and the state signal 1309 and outputs the result onto the read data bus 1307.

The specific sequence detecting mechanism 1310 outputs a value indicating an enable onto the change-all-states signal 1306 if the order in which reads and writes to the memory device 13 from the write control signal 13041 and the read control signal 13042 are performed matches a predetermined sequence. If the order of reads and writes to the memory device 13 does not match the predetermined sequence, the specific sequence detecting mechanism 1310 outputs a disable onto the change-all-states signal 1306. Hereinafter the predetermined order in which writes and reads are performed to the memory device 13 is called a specific sequence.

Operation in which the memory device shown in FIG. 40 is used to perform a process sequence shown in FIG. 41 will be described below.

Figure 41:
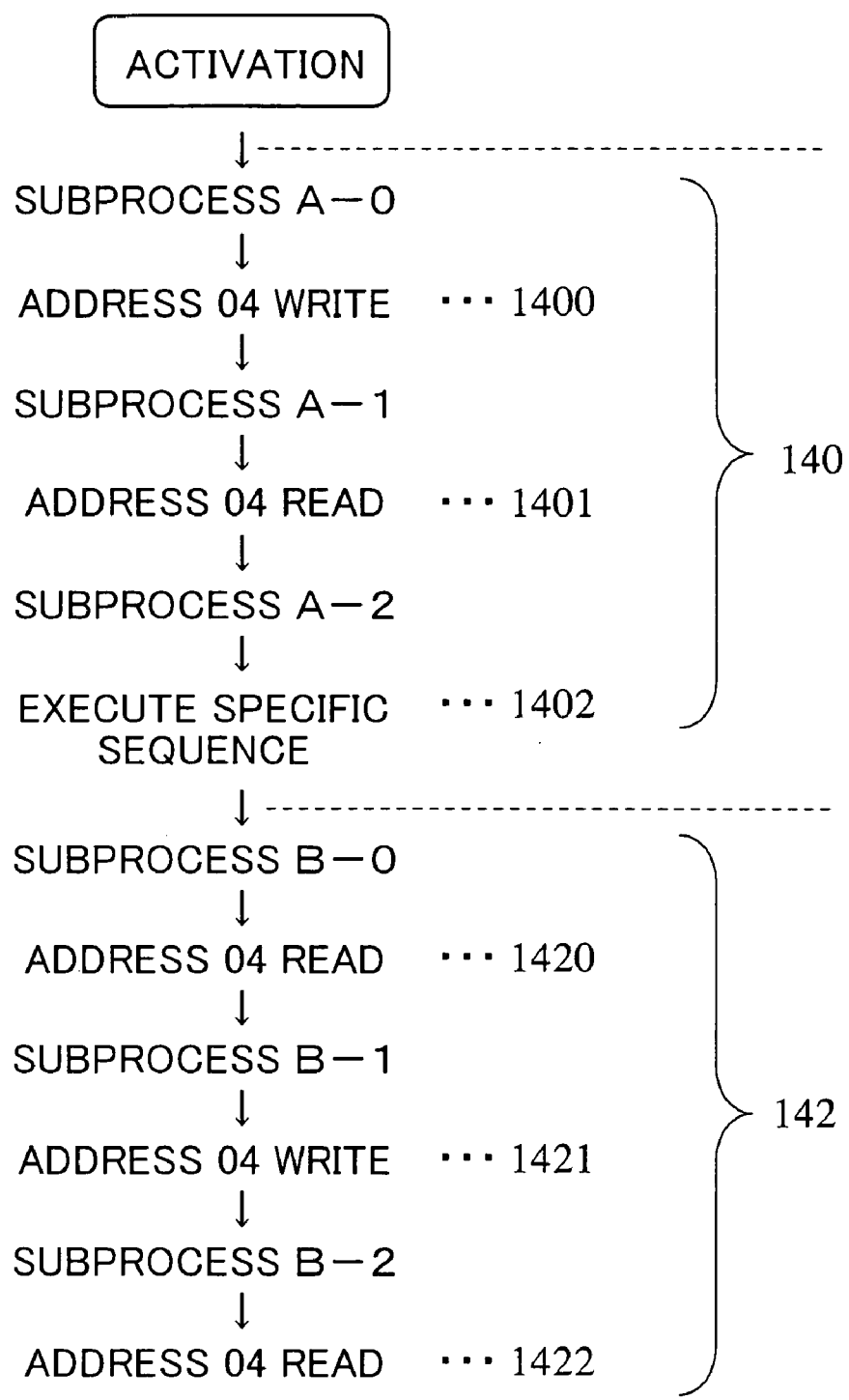
FIG. 41 is a flowchart of a process performed in a processing unit 0013 according to the seventh embodiment.

FIG. 41 shows process A indicated by reference numeral 140 and process B indicated by reference numeral 142, which are performed by the processing unit 0013 in sequence.

In process A indicated by reference numeral 140, subprocess A-0, a write 1400 to address 04, subprocess A-1, a read 1401 from address 04, subprocess A-2, and an execution of a specific sequence 1402 are performed in sequence.

In process B indicated by reference numeral 142, subprocess B-0, a read 1420 from address 04, subprocess B-1, a write 1421 to address 04, subprocess B-2, and a read 1422 from address 04 are performed in sequence.

Subprocesses A-0, A-1, A-2, B-0, B-1, and B-2 represent subprocesses that do not involve accesses to the memory device 13 by the processing unit 0013.

FIG. 42 shows internal states of the data holding unit 1300 and the state holding unit 1301 immediately after the processing unit 0013 is activated.

Any values may be held in the data holding unit 1300 and all values held in the state holding unit 1301 are indicating the inhibit state.

FIG. 43 shows internal states of the data holding unit 1300 and the state holding unit 1301 after the address 04 write 1400, which is an operation in process A 140, is performed.

On completion of address 04 write 1400, a value from the write data bus 1303 is stored in the memory area in the data holding unit 1300 that is associated with address 04 while the value stored in the memory area in the state holding unit 1301 corresponding to address 04 holds the permit state "1."

Execution of an address 04 read 1401, which is an operation in process A 140, will be described below.

When an address 04 read 1401 is performed, the memory area in the data holding unit 1300 associated with address 04 contains a value written by the address 04 write 1400. Accordingly, the value written by the address 04 write 1400 is read out onto the hold data bus 1308.

The memory area in the state holding unit 1301 that corresponds to address 04 contains the permit state "1" and therefore the value "1" is outputted onto the state signal 1309.

Thus, the same value as the value on the hold data bus 1308 is outputted onto the read data bus 1307 as a result of AND operations performed by the set of AND logic elements 13021. In this way, the value written by the write 1400 to address 04 can be read out.

Execution 1402 of a specific sequence, which is an operation of process A 140, will be described below.

FIG. 44 shows internal states of the data holding unit 1300 and the state holding unit 1301 after the completion of the execution.

Because the execution of the specific sequence causes the specific sequence detecting mechanism 1306 to enable the change-all-states signal 1306, all the values held in the state holding unit 1301 are changed to "0" indicating the inhibit state whereas the values in the data holding unit 1300 are not changed in the memory device 13.

A read 1420 from address 04, which is an operation in process B 142, will be described below.

When an address 04 read 1420 is performed, the memory area in the data holding unit 1300 associated with address 04 contains a value written by the write 1400 to address 04. Accordingly, the value written by the address 04 write 1400 is read out onto the hold data bus 1308.

However, the memory area in the state holding unit 1301 that corresponds to address 04 contains the inhibit state "0" as a result of the execution 1402 of the specific sequence, therefore "0" is outputted onto the state signal 1309.

Thus, a different value than the value on the hold data bus 1308 is outputted onto the read data bus 1307 as a result of AND operations performed by the set of AND logic elements 13021. Therefore, the value written by the write 1400 to address 04 cannot be read.

FIG. 45 shows internal states of the data holding unit 1300 and the state holding unit 1301 after the completion of the write 1421 to address 04, which is an operation in process B 142.

When a value from the write data bus 1303 is stored in the memory area in the data holding unit 1300 associated with address 04 by a write 1421 to address 04, the value stored in the memory area in the state holding unit 1301 that corresponds to address 04 holds at the same time the permit state "1."

Consequently, the value that was stored in the memory area in the data holding unit 1300 associated with address 04 by an address 04 write 1400, which is an operation in process A 140, is destroyed and the value written by the address 04 write 1421, which is an operation in process B 142, is held in that memory area.

A read 1422 from address 04, which is an operation in process B 142, will be described below.

When an address 04 read 1422 is performed, the memory area in the data holding unit 1300 associated with address 04 contains a value written by a write 1421 to address 04 and accordingly the value written by the address 04 write 1421 is read out onto the hold data bus 1308.

The memory area in the state holding unit 1301 that corresponds to address 04 contains the permit state "1" and therefore "1" is outputted onto the state signal 1309.

Thus, the same value as the value on the hold data bus 1308 is outputted onto the read data bus 1307 as a result of AND operations performed by the set of AND logic elements 13021. In this way, the value written by the address 04 write 1421 can be read.

As described above, the memory device according to the present embodiment prevents information stored by a process performed previously from being read by a subsequent process without having to use any change-all-states signal, such as a reset signal, from an external source and wasting the specific address.

The seventh embodiment can be implemented in the second, third, fourth, or fifth embodiment as well as in the first embodiment.

What is claimed is:

1. A memory device comprising:
   a data holding unit that uses a value provided through an access address bus as an address to output a value held in a memory area associated with the address onto a hold data bus, and stores a value provided through a write data bus in a memory area associated with an address indicated through said access address bus when a write control signal is enabled;
   a state holding unit that changes values held in memory areas so as to indicate an inhibit state when a change-all-states signal is enabled, whether or not said write control signal is enabled, and changes a value held in a memory area corresponding to an address provided through said access address bus so as to indicate a permit state when said write control signal is enabled; and
   a mask mechanism that performs an operation between an output from said hold data bus and an output from said state holding unit to control the security of an output read onto said hold data bus.

2. The memory device according to claim 1, wherein a logic element is provided between said state holding unit and said mask mechanism, said logic element being controlled by a permission forcing signal provided from a source external to the memory device to allow said mask mechanism to be controlled by said permission forcing signal regardless of a value held in said state holding unit that indicates a write permit/inhibit state for a write address.

3. The memory device according to claim 1, wherein a logic element is provided at an input of said state holding unit through which the change-all-states signal is inputted into said state holding unit, said logic element performing an operation between a plurality of change-all-states signals provided from a source external to the memory device to allow values held in said state holding unit to be changed.

4. The memory device according to claim 1, wherein said state holding unit comprises:
   a first state holding section that, whether or not said write control signal is enabled, changes values held in memory areas in said first state holding section so as to indicate the inhibit state when a first change-all-states signal is enabled, and changes a value held in a memory area in said first state holding section that corresponds to an address provided through said access address bus so as to indicate the permit state when said write control signal is enabled;
   a second state holding section that, whether or not said write control signal is enabled, changes values held in memory areas in said second state holding section so as to indicate the inhibit state when a second change-all-states signal is enabled, and changes a value held in a memory area in said second state holding section that corresponds to an address provided through said access address bus so as to indicate the permit state when said write control signal is enabled; and
   a logic element performing an operation of outputs of said first and second state holding sections,
   wherein said mask mechanism performs an operation between an output from said hold data bus and an output from said logic element to control the security of an output read onto the hold data bus.

5. The memory device according to claim 1, wherein said mask mechanism comprises:
   a first set of logic elements that performs an operation between an output from said hold data bus and an output from said state holding unit;
   a second set of logic elements that performs an operation between an output from said hold data bus and an output from said state holding unit, said operation performed by said second set of logic elements being different from said operation performed by said first set of logic elements; and
   a selector that selects and outputs as readout data the output from said first set of logic elements or the output from said second set of logic elements depending on a logic elements election signal specifying the permit state or inhibit state.

6. The memory device according to claim 1, comprising an access address match detecting mechanism that detects a specific address for accessing said data holding unit, wherein all values in said state holding unit that indicate write permit/inhibit states for write addresses can be changed at a time by using a signal from said access address match detecting mechanism.

7. The memory device according to claim 1, comprising a specific sequence detecting mechanism that detects a specific pattern of accesses to said data holding unit, wherein all values in said state holding unit that indicate write permit/inhibit states for write addresses can be changed at a time by using a signal from said specific sequence detecting mechanism.

* * * * *